(12) United States Patent
Moore et al.

(10) Patent No.: US 8,089,434 B2
(45) Date of Patent: Jan. 3, 2012

(54) ELECTRODED POLYMER SUBSTRATE WITH EMBEDDED WIRES FOR AN ELECTRONIC DISPLAY

(75) Inventors: Chad B. Moore, Corning, NY (US); Giacomo James Piazza, Elmira, NY (US)

(73) Assignee: Nupix, LLC, Corning, NY (US)

(*) Notice: Subject to any disclaimer, the term of this patent is extended or adjusted under 35 U.S.C. 154(b) by 1351 days.

(21) Appl. No.: 11/609,131

(22) Filed: Dec. 11, 2006

(65) Prior Publication Data

US 2007/0146862 A1 Jun. 28, 2007

Related U.S. Application Data

(60) Provisional application No. 60/749,446, filed on Dec. 12, 2005, provisional application No. 60/759,704, filed on Jan. 18, 2006, provisional application No. 60/827,146, filed on Sep. 27, 2006, provisional application No. 60/827,152, filed on Sep. 27, 2006, provisional application No. 60/827,170, filed on Sep. 27, 2006.

(51) Int. Cl.
*G09G 3/36* (2006.01)
*G02F 1/1343* (2006.01)

(52) U.S. Cl. .......... 345/87; 349/139; 349/149; 349/158; 313/582; 313/583; 313/584

(58) Field of Classification Search .............. 349/139, 349/149, 158; 345/87; 313/582–584
See application file for complete search history.

(56) References Cited

U.S. PATENT DOCUMENTS

| | | |
|---|---|---|
| 3,602,754 A | 8/1971 | Pfaender |
| 3,654,680 A | 4/1972 | Bode et al. |
| 3,927,342 A | 12/1975 | Bode et al. |
| 3,964,050 A | 6/1976 | Mayer |
| 4,027,188 A | 5/1977 | Bergman |
| 4,038,577 A | 7/1977 | Bode et al. |
| 4,554,537 A | 11/1985 | Dick |
| 4,728,864 A | 3/1988 | Dick |
| 4,833,463 A | 5/1989 | Dick et al. |

(Continued)

FOREIGN PATENT DOCUMENTS

JP 62111234 A 5/1987

(Continued)

OTHER PUBLICATIONS

Awanoto et al., "Development of Plasma Tube Array Technology for Extra-Large-Area Displays", SID 2005, pp. 206-209.

(Continued)

*Primary Examiner* — David Nelms
*Assistant Examiner* — Nathanael R Briggs
(74) *Attorney, Agent, or Firm* — Brown & Michaels, PC

(57) ABSTRACT

A sheet in an electronic display is composed of a substrate containing an array of wire electrodes. The wire electrodes are preferably electrically connected to patterned transparent conductive electrode lines. The wire electrodes are used to carry the bulk of the current. The wire electrodes are capable of being extended away from the substrate and connected directly to the printed circuit board. The transparent conductive electrode (TCE) is used to spread the charge or voltage from the wire electrode across the pixel. It is a patterned film and must be at least 50% transparent, and, for most applications, is preferably over 90% transparent. In most display applications, the electroded surface of the electroded sheet has to be flattened. Use of a thin polymer substrate yields a light, flexible, rugged sheet that may be curved, bent or rolled.

24 Claims, 23 Drawing Sheets

U.S. PATENT DOCUMENTS

| | | | |
|---|---|---|---|
| 4,896,149 | A | 1/1990 | Buzak et al. |
| 5,086,297 | A | 2/1992 | Miyake et al. |
| 5,162,901 | A | 11/1992 | Shimada et al. |
| 5,436,634 | A | 7/1995 | Kanazawa |
| 5,446,344 | A | 8/1995 | Kanazawa |
| 5,661,500 | A | 8/1997 | Shinoda et al. |
| 5,674,553 | A | 10/1997 | Shinoda et al. |
| 5,745,086 | A | 4/1998 | Weber |
| 5,838,105 | A | 11/1998 | Mitomo |
| 5,892,558 | A | 4/1999 | Ge et al. |
| 5,984,747 | A | 11/1999 | Bhagavatula et al. |
| 5,985,700 | A | 11/1999 | Moore |
| 6,072,276 | A | 6/2000 | Okajima |
| 6,111,191 | A | 8/2000 | Hall et al. |
| 6,171,762 | B1 | 1/2001 | Borrelli et al. |
| 6,197,429 | B1 | 3/2001 | Lapp et al. |
| 6,247,987 | B1 | 6/2001 | Moore |
| 6,354,899 | B1 | 3/2002 | Moore |
| 6,414,433 | B1 | 7/2002 | Moore |
| 6,431,935 | B1 | 8/2002 | Moore |
| 6,452,332 | B1 | 9/2002 | Moore |
| 6,459,200 | B1 | 10/2002 | Moore |
| 6,472,594 | B1 | 10/2002 | Ichinose et al. |
| 6,480,253 | B1 | 11/2002 | Shigeta et al. |
| 6,507,146 | B2 | 1/2003 | Moore |
| 6,515,218 | B1 | 2/2003 | Shimizu et al. |
| 6,524,773 | B1 | 2/2003 | Borrelli et al. |
| 6,570,339 | B1 | 5/2003 | Moore |
| 6,573,880 | B1 | 6/2003 | Simoni et al. |
| 6,577,060 | B2 | 6/2003 | Tokai et al. |
| 6,611,100 | B1 | 8/2003 | Moore |
| 6,677,704 | B2 | 1/2004 | Ishimoto et al. |
| 6,750,605 | B2 | 6/2004 | Moore |
| 6,771,234 | B2 | 8/2004 | Moore |
| 6,785,036 | B1 | 8/2004 | Berneth et al. |
| 6,794,812 | B2 | 9/2004 | Yamada et al. |
| 6,836,063 | B2 | 12/2004 | Ishimoto et al. |
| 6,841,929 | B2 | 1/2005 | Ishimoto et al. |
| 6,917,156 | B2 | 7/2005 | Moore |
| 6,930,442 | B2 | 8/2005 | Awamoto et al. |
| 6,932,664 | B2 | 8/2005 | Yamada et al. |
| 6,936,761 | B2 | 8/2005 | Pichler |
| 6,939,761 | B2 | 8/2005 | Pichler |
| 6,946,803 | B2 | 9/2005 | Moore |
| 6,950,173 | B1 * | 9/2005 | Sutherland et al. ............ 349/201 |
| 6,969,292 | B2 | 11/2005 | Tokai et al. |
| 7,022,910 | B2 | 4/2006 | Gaudiana et al. |
| 7,034,446 | B2 | 4/2006 | Moore |
| 7,049,748 | B2 | 5/2006 | Tokai et al. |
| 7,082,236 | B1 | 7/2006 | Moore |
| 7,456,571 | B1 | 11/2008 | Wedding |
| 2001/0009352 | A1 * | 7/2001 | Moore .......................... 313/582 |
| 2001/0033483 | A1 | 10/2001 | Moore |
| 2002/0140133 | A1 | 10/2002 | Moore |
| 2002/0149717 | A1 | 10/2002 | Borrelli et al. |
| 2003/0095094 | A1 * | 5/2003 | Goden ........................... 345/107 |
| 2003/0134506 | A1 * | 7/2003 | Kim et al. ..................... 438/637 |
| 2004/0242110 | A1 | 12/2004 | Matsuda et al. |
| 2005/0003640 | A1 * | 1/2005 | Ushiyama et al. ............ 438/502 |
| 2005/0104509 | A1 | 5/2005 | Yamashita |
| 2005/0122306 | A1 | 6/2005 | Wilcox et al. |
| 2005/0126628 | A1 | 6/2005 | Scher et al. |
| 2005/0127455 | A1 | 6/2005 | Nishiki et al. |
| 2005/0140893 | A1 * | 6/2005 | Hong ............................ 349/139 |
| 2005/0150541 | A1 | 7/2005 | Scher et al. |
| 2005/0214967 | A1 | 9/2005 | Scher et al. |
| 2006/0181763 | A1 | 8/2006 | De Zwart et al. |
| 2006/0193031 | A1 | 8/2006 | Moore |
| 2006/0214880 | A1 | 9/2006 | Moore |
| 2007/0054730 | A1 | 3/2007 | Mattice et al. |
| 2007/0058178 | A1 | 3/2007 | Kurihara et al. |

FOREIGN PATENT DOCUMENTS

| | | |
|---|---|---|
| JP | 2000085068 A | 3/2000 |
| WO | 9900695 A1 | 1/1999 |

OTHER PUBLICATIONS

C. Bergman, R.W. Johnson, R.A. Strom and T.N. Thompson, "Large Screen Plasma Display", AD728623, Final Report on Contract No. F30602-70-C-0154, Rome Air Development Center, Jul. 1971.

C. Bergman, "Plasma Display Color Techniques Using Tubular Construction", AD766933 Final Report on Contract No. F30602-72-C-0167, Rome Air Development Center, Jul. 1973.

G.W. Dick, "Three-Electrode per PEL AC Plasma Display Panel", 1985 International Display Research Conf., pp. 45-50.

H. Hirakawa et al., "Dynamic Driving Characteristics of Plasma Tubes Array", SID 2004, pp. 810-813.

M. Ishimoto et al. "Discharge Observation of Plasma Tubes", SID 2003 pp. 36-39.

W. Mayer and V. Bonin, "Tubular AC Plasma Panels," 1972 IEEE Conf. Display Devices, Conf. Rec., New York, pp. 15-18.

C. Moore and R. Schaeffler, "Fiber Plasma Display", SID '97 Digest, pp. 1055-1058.

R. Strom, "32-Inch Graphic Plasma Display Module," 1974 SID Int. Symposium, San Diego, pp. 122-123.

R. A. Strom and C. Bergman, "Large Area Plasma Display module", AD782383, Final Report on Contract F30602-72-C-0211, Rome Air Development Center, Apr. 1974.

T. Shinoda et al. "New Approach for Wall Display with Fine Tube Array Technology" SID 2002, pp. 1072-1075.

Supplementary European Search Report for European Application No. EP 06846554, Issued on Feb. 12, 2009.

The International Search Report and The Written Opinion of the International Searching Authority for PCT application No. PCT/US06/61872 mailed Mar. 10, 2008.

* cited by examiner

ELECTRODED POLYMER SUBSTRATE WITH EMBEDDED WIRES FOR AN ELECTRONIC DISPLAY

REFERENCE TO RELATED APPLICATIONS

This application claims an invention that was disclosed in one or more of the following provisional applications:
1) Provisional Application No. Provisional Application No. 60/749,446, filed Dec. 12, 2005, entitled "ELECTRODE ADDRESSING PLANE IN AN ELECTRONIC DISPLAY";
2) Provisional Application No. 60/759,704, filed Jan. 18, 2006, entitled "ELECTRODE ADDRESSING PLANE IN AN ELECTRONIC DISPLAY AND PROCESS";
3) Provisional Application No. 60/827,146, filed Sep. 27, 2006, entitled "TUBULAR PLASMA DISPLAY";
4) Provisional Application No. 60/827,152, filed Sep. 27, 2006, entitled "ELECTRODED SHEET"; and
5) Provisional Application No. 60/827,170, filed Sep. 27, 2006, entitled "WIRE-BASED FLAT PANEL DISPLAYS".

The benefit under 35 USC §119(e) of the United States provisional applications is hereby claimed, and the aforementioned applications are hereby incorporated herein by reference.

FIELD OF THE INVENTION

The invention pertains to the field of electronic displays, in particular creating an electroded plane in the flat panel display.

BACKGROUND OF THE INVENTION

Within the electronic display space there is a group of displays that create an image by modulating an electro-optic material. An electro-optic material is defined as a material that changes state in an electric field. Some of these materials can be passively addressed or simply addressed by sandwiching the electro-optic material between two orthogonal arrays of electrodes. However, this passive addressing scheme requires that the electro-optic material has a threshold or its optical properties have an abrupt change over a small change in applied voltage. Most liquid crystal (LC) materials have a steep enough threshold that allows them to be passively addressed. If the electro-optic material does not have a voltage threshold or its threshold is not steep enough (the voltage to totally modulate the material has to be less than twice the voltage of where the materials electro-optic properties start to change), then the electro-optic material has to be actively addressed. Active addressing means that a switch, like a transistor, that has a voltage threshold is used to place the voltage across the electro-optic material. Other active addressing switches that have been used are diodes, plasmas, and micro-electro-mechanical systems (MEMS). Active addressing is also used in cases that require video rate images because passive addressing requires that a line at a time addressing scheme is used and therefore the speed to update the image is limited to the number of lines in the display times the minimum response time of the electro-optic media.

There are several different types of electro-optic materials. The most well known and widely used electro-optic materials are liquid crystal molecules. In the liquid crystal family, a vast range of molecules could potentially be used to create the electro-optic modulated material. Some of these liquid crystal molecules include, but are not limited to, twisted nematic, cholesteric-nematic, dichroic dye (or guest-host), dynamic scattering mode, smectic, and polymer dispersed. Most of these liquid crystal molecules require other films, such as alignment layers, polarizers, and reflective films.

Another type of electro-optic material is electrophoretic. Electrophoretic material is a suspension of small charged particles in a liquid solution. If the particles have a similar density as the liquid solution, they are not affected by gravity. Therefore the only way to move the particles is using an electric field. By applying a voltage potential across the electrophoretic solution, the charged particles are forced to move in the suspension to one of the contacts. The opposite charge moves the particles in the other direction. The electrophoretic suspension is designed such that the particles are a different color than the liquid solution or there are two different colored particles with opposite charge states.

Another type of electro-optic material is a twisting ball or Gyricon material. It was initially called twisting ball material because it is composed of small bichromal spheres, one side coated black, the other white with opposite charges on the two halves. Therefore, when the twisting ball material is placed in an electric field, the bichromal spheres all rotate to display one optical property of the material and when the opposite voltage is applied, the material displays the other colored state. This Gyricon material can also be made in a cylindrical form.

Research Frontiers Incorporated has developed another electro-optic material that they call a suspended particle device (SPD) which consists of microscopic particles in a liquid suspension. These microscopic particles are elongated in one direction and, when randomly orientated, block light. When a voltage is applied across the electro-optic material, the particles align and transmit light.

Most of these electro-optic materials do not have a voltage threshold and must be actively addressed. Some of the liquid crystal materials use an active transistor back plane to address the displays, but these types of displays are presently limited in size due to the complicated manufacturing process. Transmissive displays using liquid crystal materials and a plasma-addressed back plane have been demonstrated in U.S. Pat. No. 4,896,149, herein incorporated by reference, however, these plasma-addressed back planes are also limited in size due to availability of the thin microsheet to create the plasma cells.

One potential solution for producing large size displays is to use fibers/tubes to create the plasma cells. Using tubes to create a plasma-addressable plasma cell was first disclosed in U.S. Pat. No. 3,964,050, herein incorporated by reference. One potential issue in producing large plasma-addressed tubular displays is creating the top column electrode plate. This plate has to be composed of an array of lines to address that set the charge in the plasma tubes. When addressing a thin electro-optic material like a LC or electrophoretic material, these electrode lines have to be wide enough to spread the charge across the width of the entire pixel. The lines also have to be conductive enough to set the charge in the plasma tube so the display can be addressed at video rates. A traditional patterned indium tin oxide (ITO) transparent conductor works fine for smaller panels where processing the panel is easy and the lines are short, however to address very large panels, the ITO lines are not conductive enough and patterning of the lines becomes very expensive.

One method to solve this problem has been proposed in U.S. patent application Ser. No. 11/236,904 "Electrode Enhancements for Fiber-Based Displays", filed Sep. 28, 2005, and herein incorporated by reference. In that application, fiber containing an electrode is used to form the column electrode plane. The electrode is composed of a wire electrode, which carries the bulk of the current and a transparent conductive electrode, which is connected to the wire electrode and is used to spread the voltage across the surface of the fiber.

Connecting a higher conductive metal film electrode to a transparent conductive film to spread the voltage of the electrode is also traditionally used in the top electrode plate of a plasma display (PDP). The top PDP plates use a 50 μm wide by about 1 μm thick Cr/Cu/Cr stack to carry current and a thin ITO coating to spread the effect of the voltage, hence spreading the firing of the plasma. These electrode coatings are evaporated or sputtered and then photolithograph is used to pattern them and they are then etched into lines using a wet etch or a reactive ion etch (RIE).

Photovoltaic cells also use conductive metal lines connected to transparent conductive coatings to collect the current from the photovoltaic device. The use of wire connected to a transparent conductive coating has been disclosed by Nanosolar in U.S. Pat. Nos. 6,936,761 and 7,022,910, herein incorporated by reference, for solar cell applications.

SUMMARY OF THE INVENTION

The invention is a sheet in an electronic display composed of a substrate containing an array of wire electrodes. The wire electrodes are preferably electrically connected to patterned transparent conductive electrode lines, as well as methods of making the sheet. The wire electrodes, which are defined as a highly conductive thread-like or fiber-like material, are used to carry the bulk of the current. The wires are preferably formed using a standard wire forming process; they are free standing entities and are not evaporated or deposited on the substrate. The wire electrodes are capable of being extended away from the substrate and connected directly to a printed circuit board. The transparent conductive electrode (TCE) is used to spread the charge or voltage from the wire electrode across the pixel. It is a patterned film and, in most display applications, must be at least 50% transparent, and is preferably ≧90% transparent. The TCE is preferably composed of a transparent conductive polymer, nanotubes, or a PVD material like ITO. The TCE must form a good electrical connection with the wire electrode (low interface resistance) and must be electrically connected to the wire electrode along most of the length of the electrode. The TCE material does not have to have a high conductivity because it only needs to be conductive enough to spread the charge or voltage across the pixel width. The substrate that houses the wires/TCE strips is preferably polymer or glass. Use of a thin polymer substrate yields a light, flexible, rugged sheet that can be curved, bent or rolled.

In order for the electroded sheet (eSheet) to be used in most display applications, the electroded surface is preferably flattened. The electroded sheet may be used as an addressing plane in a passive or actively addressed display. Alternatively, it may be used as a sustainer layer or column addressing layer in a tubular plasma display. The electroded sheet may be used to capacitively address an electro-optic material or capacitively set-up the charge in a panel. The electroded layer may also be used as current carrying strips to address materials such as electrochromic materials or organic light emitting materials.

BRIEF DESCRIPTION OF THE DRAWINGS

FIG. 6b schematically shows the wires imbedded in the polymer film using the process shown in FIG. 6a.

FIG. 7b schematically shows the wires with TCEs with polymer film after the process of FIG. 7a.

FIG. 8b schematically shows the wires with TCEs with polymer film after the process of FIG. 8a.

FIG 11b is a close-up image of FIG. 11a.

DESCRIPTION OF THE PREFERRED EMBODIMENT

Figure 1:
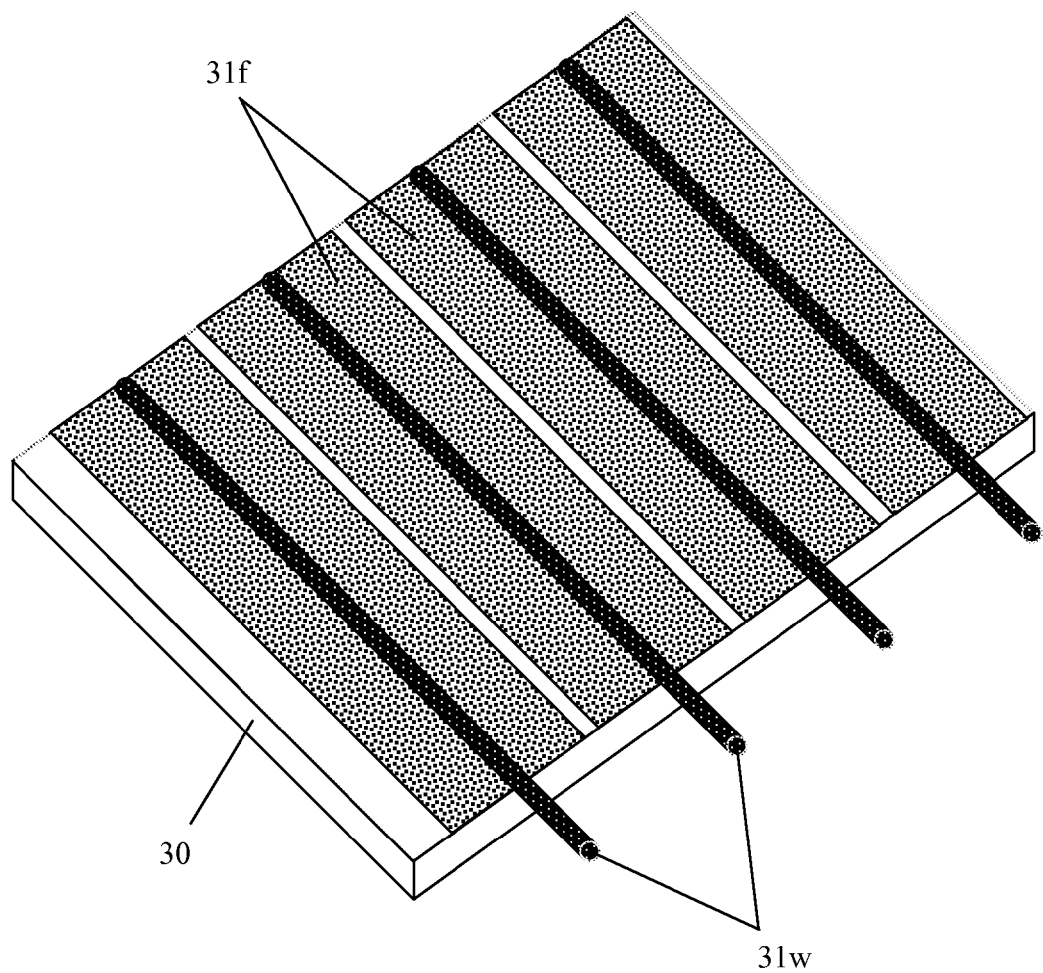
FIG. 1 schematically shows an array of wire electrodes electrically connected to transparent conductive lines on a substrate.

A layer in an electronic display is composed of a substrate 30 containing an array of wire electrodes 31w electrically connected to patterned transparent conductive electrode 31f lines, as shown in FIG. 1. The wire electrodes 31w, which are defined as a highly conductive thread-like or fiber-like material, are used to carry the bulk of the current. The wires are formed using a standard wire forming process; they are free standing entities and are not evaporated or deposited on the substrate. The wire electrodes 31w are capable of being extended away from the substrate 30 and connected directly to a printed circuit board. The transparent conductive electrode (TCE) 31f is used to spread the charge or voltage from the wire electrode 31w across a pixel. The TCE 31f is a patterned film that, in most display applications, must be at least 50% transparent, and is preferably over 90% transparent. The TCE 31f must form a good electrical connection with the wire electrode 31w (low interface resistance) and must be electrically connected to the wire electrode 31w along most of the length of the electrode. The TCE material does not have to have a high conductivity because it only needs to be conductive enough to spread the charge or voltage across the pixel width. The substrate 30 that houses the wires/TCEs strips is preferably polymer or glass. Use of a thin polymer substrate 30 yields a light, flexible, rugged sheet that may be curved, bent or rolled.

Using a wire combined with a TCE to form the electrode strips allows for very high speed addressing of a very large display. The wire electrode, which is used to carry the bulk of the current along the length of the line, has a low resistive drop because it can be composed of a highly conductive material, like copper, and also has a large cross-sectional area compared to a metal film electrode ($R=\rho l/A$). In order to get a metal film electrode with a low resistivity, the metal has to be deposited using a physical vapor deposition (PVD) process like e-beam evaporation or sputtering, then patterned and etched, which is very costly. Reasonable conductivity may be alternatively achieved using a screen printed silver paste; however, the silver paste has to be fired at elevated temperatures (~400° C.) to achieve any real conductivity, which is much too high a temperature for most polymers. Most metal conductive coatings that may be economically applied to polymer substrates have only slightly better conductivity (~5 $\Omega/\square$) compared to the most conductive ITO films (~10 $\Omega/\square$).

Controlling the addressing of a large display requires that the voltages applied to the electrodes be uniformly brought up to voltage along the entire length of the line especially if grayscale addressing is required. The lines have resistance along their length and are capacitively coupled to the orthogonal electrodes. The time for the far end of the line to come up to 98% of the total voltage is $\tau=4RC$. Assuming a 3'×6' display at 20 dpi is used to address a 5 μm thick liquid crystal with an average dielectric constant of 15, then the total line capacitance is 62 nF. If the line was formed using a highly conductive transparent material with a sheet resistance of 100 $\Omega/\square$ then the resistance of the entire line would be 144 k$\Omega$ and the line would take 8.9 ms to come up to 98% of the total voltage. If a 0.002" diameter copper wire is used to carry the current along the length of the electrode, the line resistance would be reduced to 15 $\Omega$ and take less than 1 μs to come up to voltage.

The wire electrode may be composed of any composition; however using a lower resistivity base material yields the most conductive wire. One potential issue with a highly reflective colored material like copper is that it changes the color of the electroded layer. One method of removing this reflective copper color is to coat the wire electrode with a black absorbing film. This black absorbing layer has to be electrically conductive so it can make good electrical connection to the transparent conductive electrode (TCE). The TCE is preferably composed of one or more of many different materials including, but not limited to, 1) a conductive polymer, such as that sold by Bayer called Baytron®, which also goes by the names of Poly(3,4-ethylenedioxythiophene) poly (styrenesulfonate) or $[-CH_2CH(C_6H_4SO_3H)-]_m$ $[-CH_2CH(C_6H_4SO_3)-]_{0.33n}/[C_6H_4O_2S-]^{0.33+}n$ or PEDT/PSS or PEDOT/PSS; or 2) a nanotube or nanorod coating, such as composed of a single wall carbon nanotube or multi-wall carbon nanotubes; or 3) a physical vapor deposited (PVD) film, such as indium tin oxide (ITO) or zinc oxide doped with fluorine (ZnO:F). There are many different types of TCE films that may be used, the above films are listed as examples only and are not intended to be an exclusive listing of all the different TCE films.

There are many different methods of applying the TCE coatings. The TCE coatings may be sprayed using a traditional spraying system, however for some of the TCE coatings, like the nanotube solutions, it would be advantageous to use an ultrasonic sprayer to help break the nanotubes apart as they are sprayed. The TCE coating may also be sprayed using an airbrush, which is useful in that its spray opening may be very well controlled to only let small particles through, hence controlling any agglomerates. Alternatively, the TCE coatings may be printed, which would allow for a low cost method of patterning the lines. Some examples of the printing process include, but are not limited to, transfer printing, screen printing, inkjet printing, and intaglio printing. If a TCE slurry solution is used, then the TCE coating may alternatively be brush coated, dip coated, spin coated, extruded, etc. If the TCE coating is a hard coating, like ITO, then a physical vapor deposition (PVD) process is required like e-beam evaporation, sputtering, CVD, arc spraying, etc.

The TCE coating has to be patterned into lines to electrically isolate one wire with TCE from its adjacent electrode. If a precision printing process is used, then the TCE coating may be easily patterned during the deposition process. If a directional coating process is used to deposit the TCE film like spraying or some of the PVD processes, then a shadow mask may be used to pattern the TCE film into lines. The TCE coating may alternatively be patterned by applying an additional patterned coating, like photoresist, to protect the TCE during an etching process. The patterning and etching process may use several different masking films and methods of applying the masking films and may use a wet or dry etching process to pattern the TCE into lines. The TCE coating may alternatively be patterned into lines using a lift-off process, where prepattern lines are placed on the substrate at the points where the TCE is to be separated then after the TCE film is deposited, the prepatterned lines are removed separating the TCE film into lines. The prepatterned lines may be a polymer, like photoresist, or hard lines like wire, fiber or thread that is removed once coated, which is very similar to a shadow mask. The TCE film may alternatively be cut into lines using a scraping tool or cut with a laser. The TCE film could also be cut by forcing wedge shaped line objects down into the coating. Adjacent TCE coatings may alternatively be electrically isolated by coating the film along the separation lines with a material the reacts with the TCE to destroy the conductive nature of the film. The conductive nature of the TCE film may also be destroyed using heat from a laser beam. There are many different methods of depositing a patterned transparent conductive electrode (TCE), the above methods are listed as examples only and are not intended to be an exclusive listing of all the different coating and patterning methods.

Figure 2A:
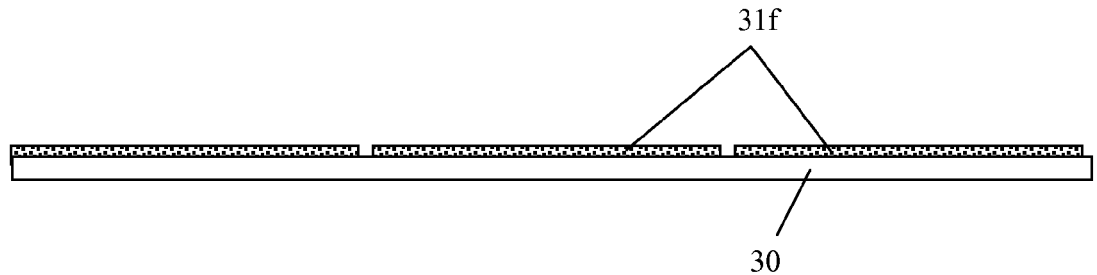
FIG. 2a schematically shows a cross-section of a substrate with an array of transparent conductive lines on a substrate.
Figure 2B:
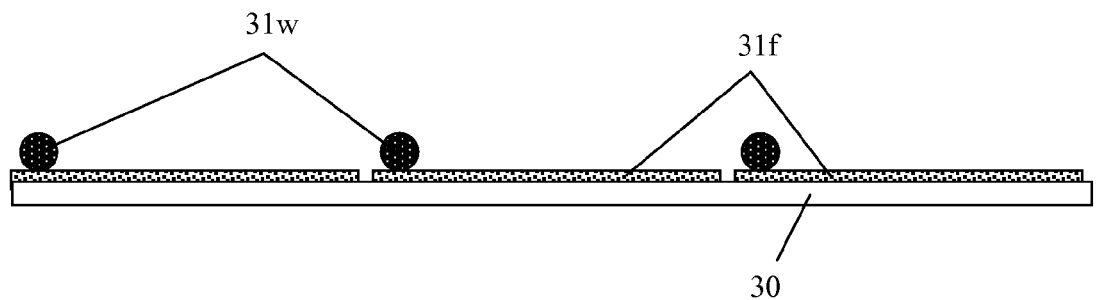
FIG. 2b schematically shows a cross-section of the structure in FIG. 2a with wire electrodes added to the transparent conductive lines.
Figure 2C:
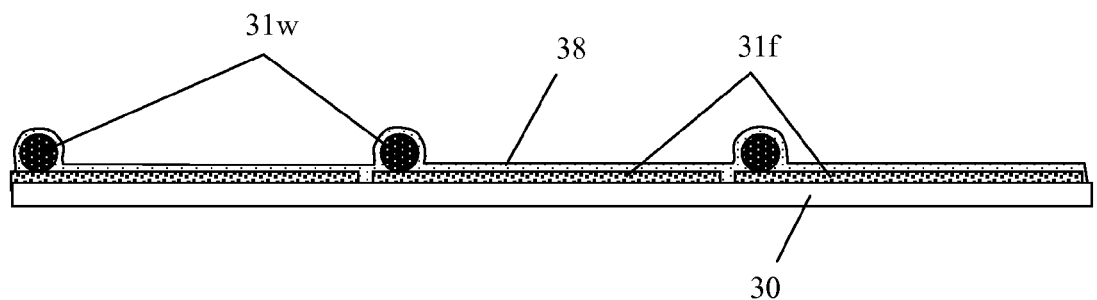
FIG. 2c schematically shows a cross-section of the structure in FIG. 2b with a lockdown film across the wire electrodes.

FIG. 2 shows a method of forming the electroded sheet where the wires $31w$ and the TCEs $31f$ are placed on a thin polymer or glass substrate 30 and locked down onto the substrate with a film or coating 38. This electrode configuration allows for electrical communication with the rest of the display through the thin polymer or glass substrate 30. This structure requires a voltage drop across the thin substrate, but if the thickness of the substrate is very uniform, then the electric field is very uniform across the pixel and panel. FIG. 2a shows the first step in the process where the TCEs $31f$ are deposited in a pattern on the substrate 30. FIG. 2b shows wire electrodes $31w$ applied to the TCEs $31f$. A lock down coating 38 is applied over the electrodes to hold them in place, as shown in FIG. 2c. Note that the patterned TCEs $31f$ do not have to be wide lines, but may have structure associated with them, such as sometimes used in a sustainer plate for a plasma display like a tubular plasma display discussed below.

Figure 3:
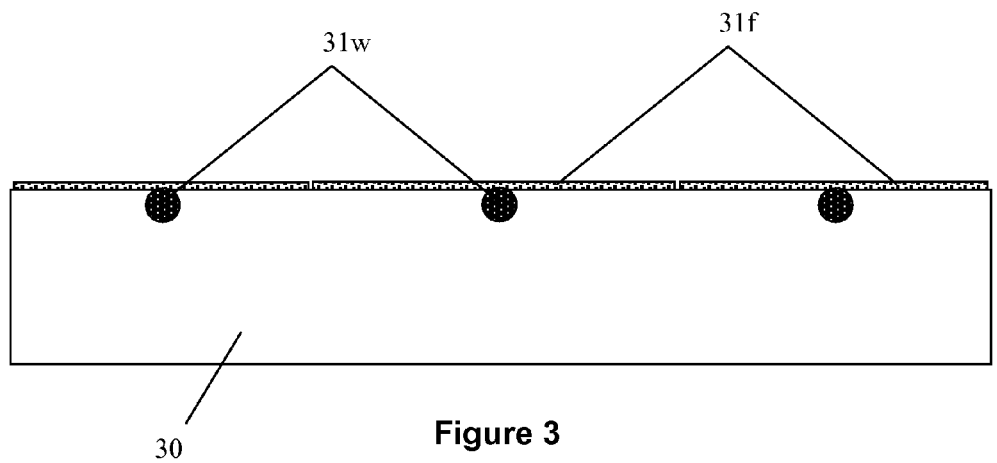
FIG. 3 schematically shows a cross-section of wire electrodes imbedded in the surface of a substrate and electrically connected to transparent conductive electrodes (TCEs).

Some applications require that the electrodes are located on the surface that is in contact with the electro-optic material to either supply current to the electro-optic material, such as an electrochromic device or an organic light emitting display (OLED), or to maximize the voltage across the electro-optic material. It is also imperative in most of these displays that the surface of this electroded sheet be flat. Therefore, the wire electrodes $31w$ have to be imbedded into the surface of the substrate 30. FIG. 3 shows an example of an electroded sheet where the wire electrodes $31w$ are imbedded into the surface of the substrate 30 and TCEs $31f$ are applied to the surface of the substrate 30 and electrically connected to the wire electrodes $31w$. Although the substrate 30 may be glass, it is much easier to imbed wire into the surface of a plastic plate.

Figure 4:
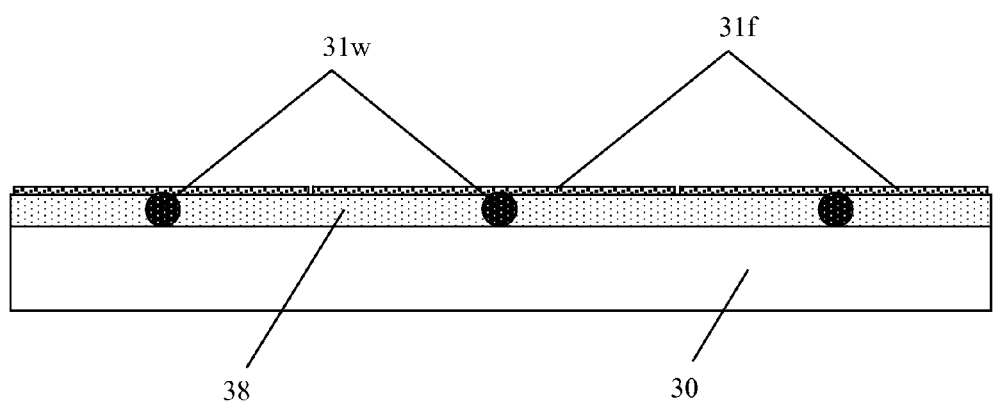
FIG. 4 schematically shows a cross-section of wire electrodes imbedded in the surface of a polymer film on a substrate and the wire electrodes electrically connected to TCEs.

FIG. 4 show another example of wire electrodes $31w$ imbedded into a substrate. In this case, a substrate 30 is coated with a polymer layer 38 containing wire electrodes $31w$, which are connected to the TCEs $31f$. The polymer layer 38 locking the wire electrodes $31w$ to the substrate may be formed using many different processes. The wires $31w$ may be extruded with the polymer layer 38 directly onto the surface, the wires $31w$ could be arrayed on the surface and coated with the polymer layer 38, or the substrate 30 could contain the polymer layer 38 and the wire electrodes $31w$ could be simply pushed into the polymer layer 38. The substrate 30 may be composed of glass, however, if a flexible, rugged electroded sheet is required then it is advantageous to use a polymer substrate. One low cost, readily available flexible material is a polymer coated polyethylene terephthlate (PET, sold by DuPont under the trademark Mylar®) film.

Figure 5:
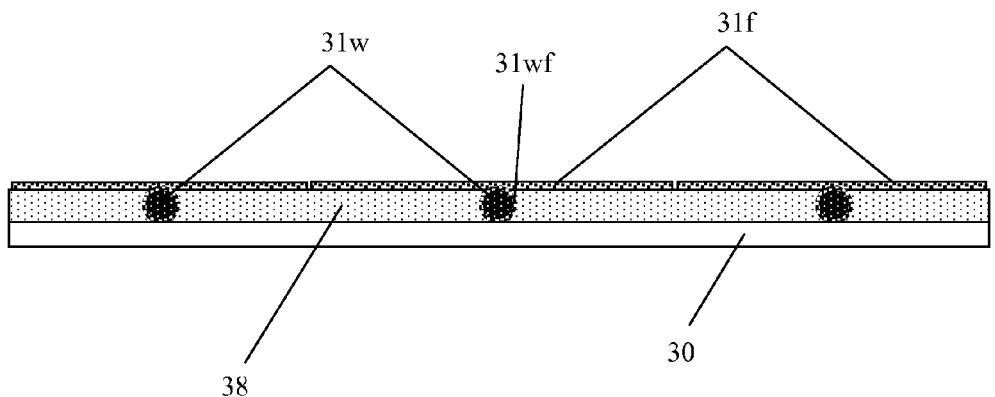
FIG. 5 schematically shows a cross-section of a structure similar to that in FIG. 4 where the wire electrodes are coated with an electronically conductive film.

FIG. 5 shows the wire electrodes $31w$ coated with a conductive coating $31wf$ in one embodiment of the present invention to lower interface resistance between the wire $31w$ and the TCE $31f$. This wire conductive coating $31wf$ may be formulated to have a lower interface resistance with the wire electrode $31w$. Adding nanotubes or nanorods to the wire conductive coating helps connect the wire electrode $31w$ to the transparent conductive electrode $31f$ during the subsequent flattening process, discussed below. The coating $31wf$ may alternatively be black or absorbing to remove any reflection from the wire electrode $31w$. For example, adding a black conductive coating to a copper wire $31w$ removes the "copper" tint in the layer. A wire coating $31wf$ also helps the wire $31w$ adhere to the polymer film 38. The wire electrode, which may have any cross-sectional shape including, but not limited to, round, oval, square, rectangular, or triangular shape, may also have surface structure to help it stick to polymer film 38.

FIG. 6 represents a method of creating the electroded sheet by forcing an array of wire electrodes $31w$ onto a polymer coated 38 substrate 30 and then spray coating $31s$ TCE $31f$ lines onto the wires $31w$ using a mask 69. FIG. 6a shows forcing the wires $31w$ into the surface of the polymer film 38. Two flat glass plates 10a and 10b are sandwiched around the wires $31w$ and polymer coated 38 substrate 30. By applying force to the plates and heat to soften the polymer film 38, the wires $31w$ may be pushed into the polymer film 38 surface. Some examples of applying force to the plates 10 include, but are not limited to, using a ram, a pressurized bladder or a vacuum bag.

Figure 6A:
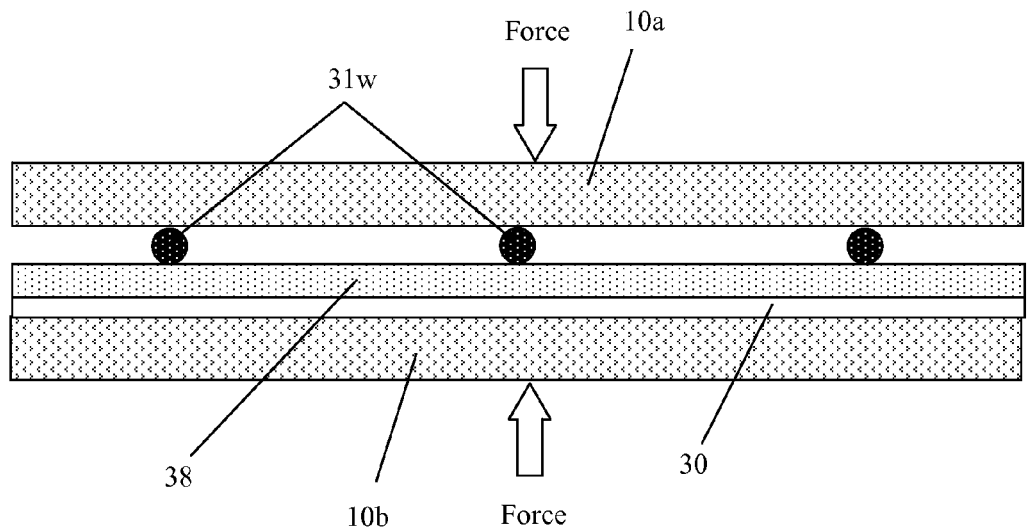
FIG. 6a schematically shows a method of using glass plates to force wires into the surface of a polymer coated substrate.
Figure 6B:
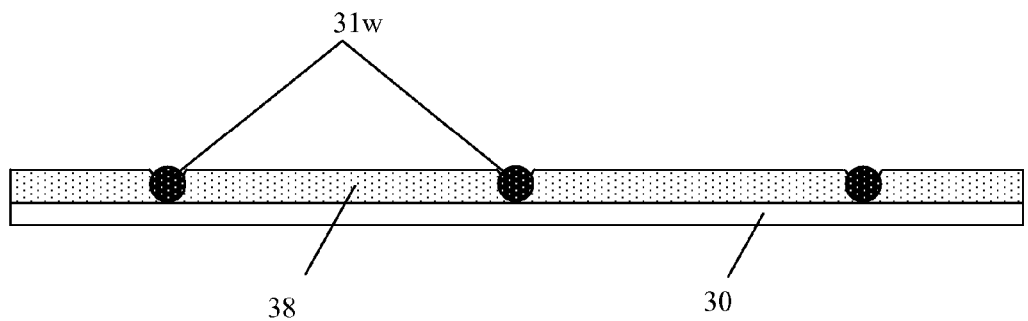

One advantage of using glass plates 10 to push the wires $31w$ into the surface of the polymer film 38 is that the glass plates produce a very flat surface with the wire electrode $31w$ and the polymer film 38 all in the same plane, as shown in FIG. 6b. This very flat surface provides for a well controlled electro-optic cell gap. Several different methods could be used to push the wire electrode $31w$ into the polymer 38 surface. The wires $31w$ and coated 38 substrate 30 may be pulled through a die or they may be pulled through or across rollers. The entire process may alternatively be done in a roll-to-roll process.

One advantage of using a polymer film 38 on a higher temperature substrate 30 like PET is that the PET substrate 30 will not soften during the wire $31w$ imbedding process and thus acts as a backstop for the wire electrodes $31w$. Therefore, the maximum final depth of the wire electrodes $31w$ into the polymer film 38 is limited to the total thickness of the polymer film (minus the extra volume that the wires displace). Therefore, if the diameter of the wire electrodes $31w$ is larger than the thickness of the polymer film 38, then the wire electrodes 31w are not totally imbedded into the polymer film 38. These protruded wire electrodes 31w may be used to form spacers for an electro-optic material when the electroded sheet is placed against a second substrate.

Figure 6C:
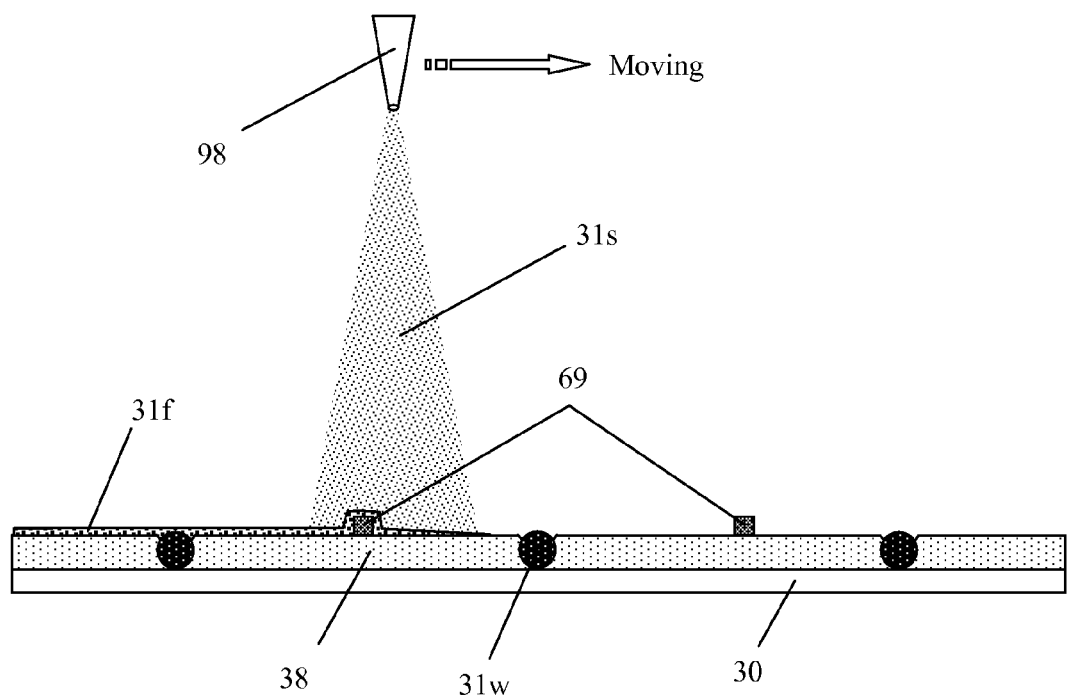
FIG. 6c schematically shows a process of patterning TCEs on the surface of a substrate.
Figure 6D:
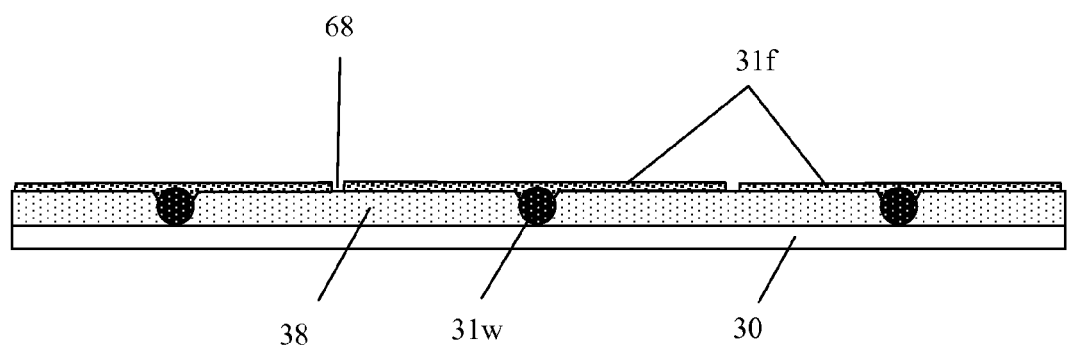
FIG. 6d schematically shows the final electroded sheet with the wire imbedded in a polymer and electrically connected to TCEs.

Once the wires 31w are forced into the surface of the polymer film 38, TCE 31f lines are patterned across the wire electrodes 31w. FIG. 6c shows a method of using a sprayer 98 to spray 31s a transparent conductive material onto the wire electroded surface. The transparent electrode material 31f is shadowed or blocked from depositing on the surface using a shadow mask 69. Some examples for the shadow mask include, but are not limited to, wire, fiber, monofilament, or even a thread, which is preferably coated to reduce the "hair" on the sides of the thread. It is also advantageous to wrap the wire 31w imbedded substrate 30 with the shadow mask 69 onto a curved surface to keep the shadow mask 69 tight against the surface of the polymer film 38 during the spraying 31s process. When the shadow mask 69 is removed, it creates openings 68 in the TCE 31f material, hence patterning it into lines and electrically isolating each electrode line from its adjacent electrode counterpart, as shown in FIG. 6d. Once the wire electrodes 31w are forced into the surface of the polymer film 38, any process may be used to deposit and pattern the TCEs 31f.

Figure 7A:
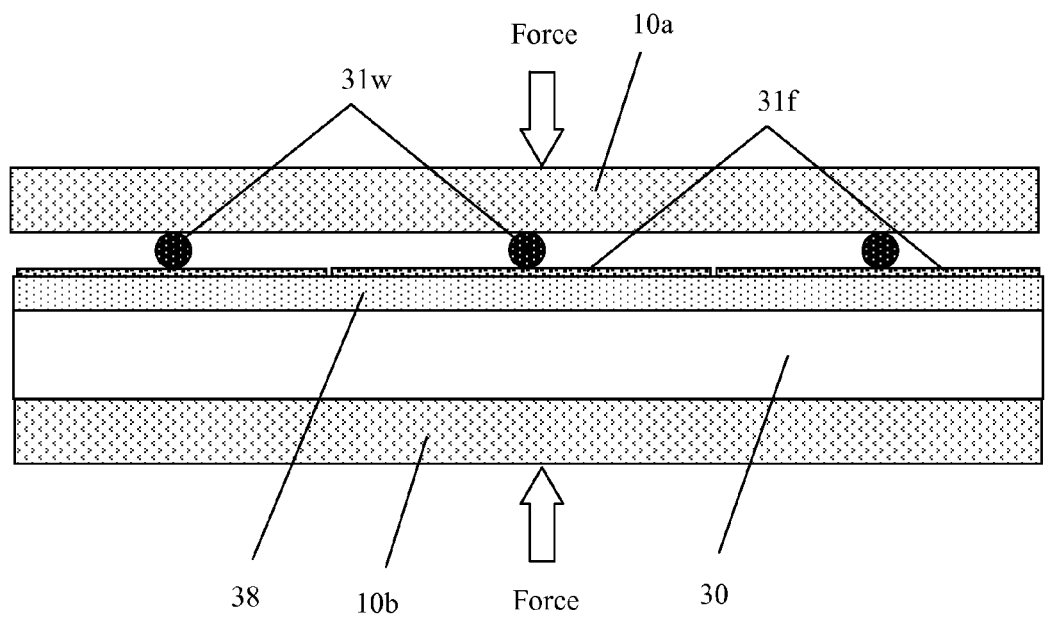
FIG. 7a illustrates a method of placing wire electrodes over TCEs and forcing them to flow into the surface of a polymer.
Figure 7B:
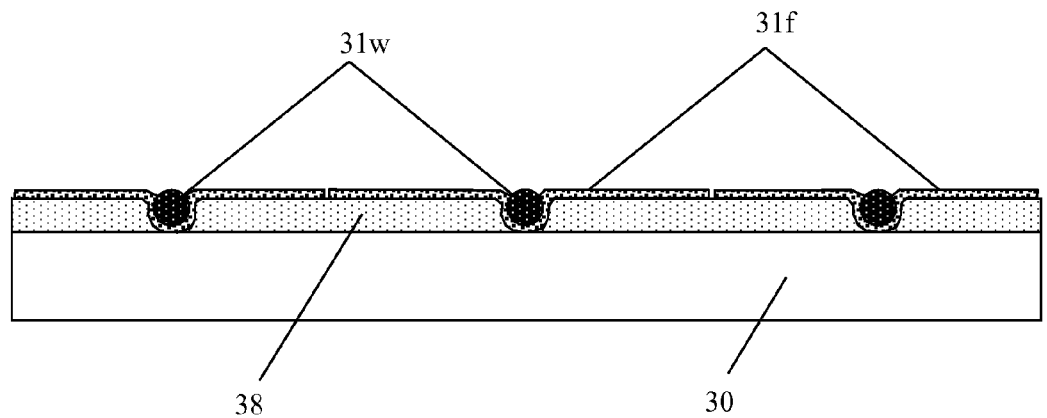

FIGS. 7 and 8 show methods of creating the electroded sheet which are similar to that explained in FIG. 6 except the TCEs 31f are placed under or over the wire electrodes 31w before they are pushed into the surface of the polymer film 38. FIGS. 7a and 7b show a method of placing the patterned TCEs 31f under the wire electrodes 31w as they are forced into the polymer film 38 coated substrate 30. This method of forming the electroded sheet requires that the TCE 31f coating is thermoformable or can flow. Some conductive polymer films are thermoformable and the nanotube coatings are flowable to some degree, however most of the PVD films like ITO tend to break up when forced to flow.

Figure 8A:
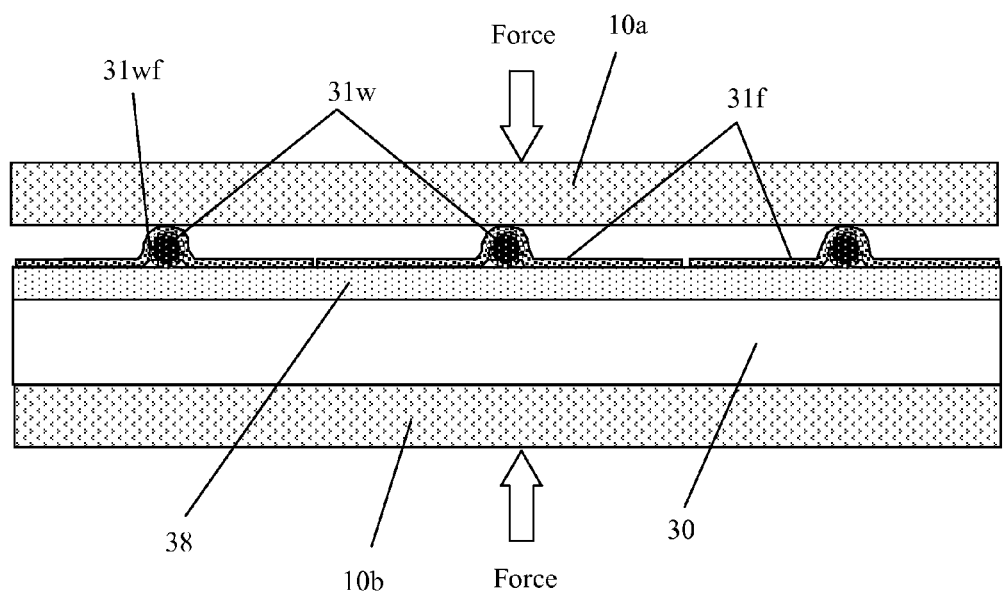
FIG. 8a illustrates a method of placing TCE lines over wire electrodes and forcing them to flow into the surface of a polymer.
Figure 8B:
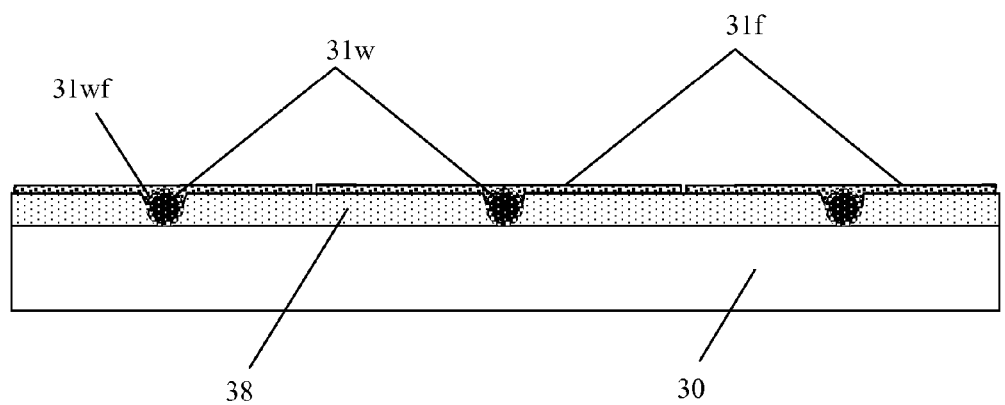

FIGS. 8a and 8b show a method of covering the wire electrodes 31w with patterned TCEs 31f and forcing them to flow into the surface of polymer film 38. Coating the wire electrodes 31w with a conductive film 31wf helps keep the wires 31w electrically connected to the TCEs 31f during the flowing process. Also if the TCE 31f is composed of carbon nanotubes, then when the flat glass plate 10 pushes against the nanotube coating any nanotubes sticking up will be either forced flat or into the polymer film 38, such that they do not protrude into electro-optic material and affect the local electric field in the electro-optic layer after display assembly.

Drum Process

The above examples all explain methods of pushing the wire electrodes 31w into a polymer substrate 30 or a polymer film 38. Pushing the wire electrodes 31w into the substrate 30 or 38 with a plate 10 creates an electroded substrate 30 or 38 where the wire electrodes 31w are even with the top of the substrate and the plate 10 creates a very flat surface. However, the plate 10 is in contact with the polymer surface 30 or 38, which may create contamination or cause the polymer substrate 30 or 38 to stick to the plate 10. Another method of placing the wire electrodes 30w into the polymer surface is to force the polymer 30 or 38 to flow into the wire electrodes 31w, such as tensioning wires 31w on a curved polymer 30 or 38 surface.

Figure 9:
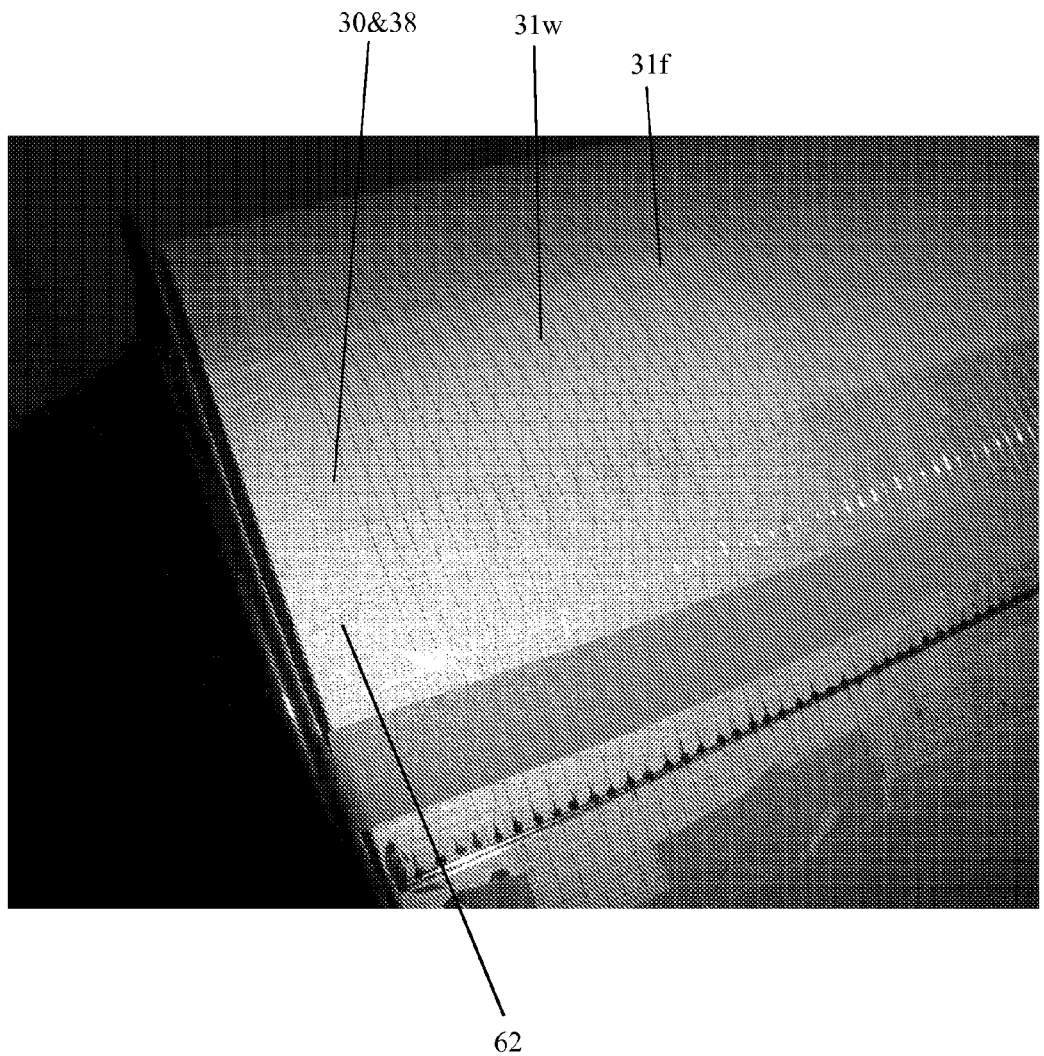
FIG. 9 is a photograph of a drum showing the process of imbedding wires into a polymer coated PET sheet.

FIG. 9 shows a method of using a drum 62 to force a polymer 38 coated substrate 30 out into wrapped wires 31w. The drum 62 is wrapped with a polymer 38 coated substrate 30 (like a PET substrate) with the polymer coating 38 facing outward. The wire electrode 31w is then wrapped around the drum 62 across the surface of the polymer 38 coated PET substrate 30. The wrapped drum 62 is then heated to soften the polymer coating 38. During the temperature change, the drum 62 and the wire 31w expand. Choosing a drum 62 material that has a higher expansion coefficient than the wire 31w places the wire 31w under tension and forces the wire 31w into the surface of the polymer 38. The effective length of the wire 31w on the drum 62 after the increase in temperature ΔT as a result of the expansion of the drum is given by $$L_w(\Delta T_D) = \pi[d_D(1+CTE_D\Delta T)+2t_s+2r_w]$$ Equation 1 where $d_D$ is the diameter of the drum 62, $CTE_D$ is the coefficient of thermal expansion of the drum 62, $t_s$ is the thickness of the PET substrate 30 and $r_w$ is the radius of the wire electrode 31w. The effective length of the wire 31w on the drum 62 after the increase in temperature ΔT as a result of the expansion of the wire is given by $$L_w(\Delta T_w) = \pi[(d_D+2(t_s+t_f)+2r_w)(1+CTE_w\Delta T)]$$ Equation 2 where $CTE_w$ is the coefficient of thermal expansion of the wire 31w and $t_f$ is the polymer film 38 thickness. Note that these equations assume that the wire electrode 31w has sunk through the polymer film 38 and is resting on the PET substrate 30 surface. If the effective length of wire 31w as a result of wire expansion (Equation 2) is longer than the effective length of wire 31w as a result of drum 62 expansion (Equation 1) then the wire 31w does not sink into to PET substrate 30 unless the wire 31w is sufficiently tensioned when wrapped onto the drum 62. To calculate the length of the wire 31w before the wire 31w sinks through the polymer film 38 leading to the maximum stress on the wire 31w, the thickness of the polymer film 38 should be added to the substrate 30 thickness $t_s$. The total stress on the wire 31w after the increase in temperature ΔT and sinking into the PET substrate 30 surface is simply given by Youngs Modulus of the wire material, $YM_w$, times the strain (ΔL/L) or $$Stress_{\Delta T} = YM_w[L_w(\Delta T_D) - L_w(\Delta T_w)]/L_w(\Delta T_w)$$ Equation 3

Note that the diameter of the drum 62, the change in temperature, ΔT, and the difference in expansion coefficient between the drum 62 and wire 31w materials have the largest effects on the wire 31w stress at the elevated temperature.

As the temperature increases, the drum 62 expands to tension the wire 31w and the polymer film 38 softens such that the wire 31w sinks into the polymer film 38. The wire 31w stops once it 31w reaches the PET substrate 30, which does not soften at the elevated temperatures. Choosing a polymer film 38 thickness equal to the diameter of the wire 31w places the surface of the wire 31w and the surface of the polymer 38 coated PET 30 at the same level. However, when the wire 31w is forced into the polymer film 38 it displaces the same volume of polymer 38 material. Since there is no plate pressing down on the surface, small mounds of polymer material 38 push-up on the sides of the wires. These polymer mounds may be flattened during a post flattening process. A transparent conductive electrode (TCE) 31f may be patterned onto the wire electrodes 31w after they are imbedded into the polymer film 38. Since the wire 31w containing polymer 38 substrate 30 is already wrapped on a drum 62, the simplest process to pattern the TCE 31f is to use a wire masking process. A second wire or a thread mask 69 may be wrapped onto the drum 62 between the wire electrodes 31w. Wrapping the wire or thread mask 69 under tension places it very tight onto the polymer film 38. Spraying the drum 62 with the TCE 31f and unwinding the wire or thread mask 69 creates a patterned TCE 31f. Note that any areas on the polymer 38 coated PET 30 may be masked before spraying the TCE 31f to create non-coated areas.

If a slot is placed across the surface of the drum 62 and the polymer 38 coated PET 30 is not placed across the slot, then a circuit board could be plugged into the wire electrodes 31 and soldered into the wires 31w. Therefore, when the wires 31w are finally cut a wire 31w electroded sheet with TCE 31f connected to a printed circuit board is formed off of a single drum 62.

The wire may alternatively be tensioned on the drum 62 using many other different methods. The drum 62 may be composed of two or more pieces and the pieces could be forced outward to place tension on the wire 31w. Force on the wire 31w may alternatively be applied be pushing or pulling the wires 31w. For example, a slot may be placed in the drum 62 and a printed circuit board may be connected into the wires 31w and pulled toward the center of the drum 62 in part tensioning the wires 31w.

Arced Plate

Figure 10:
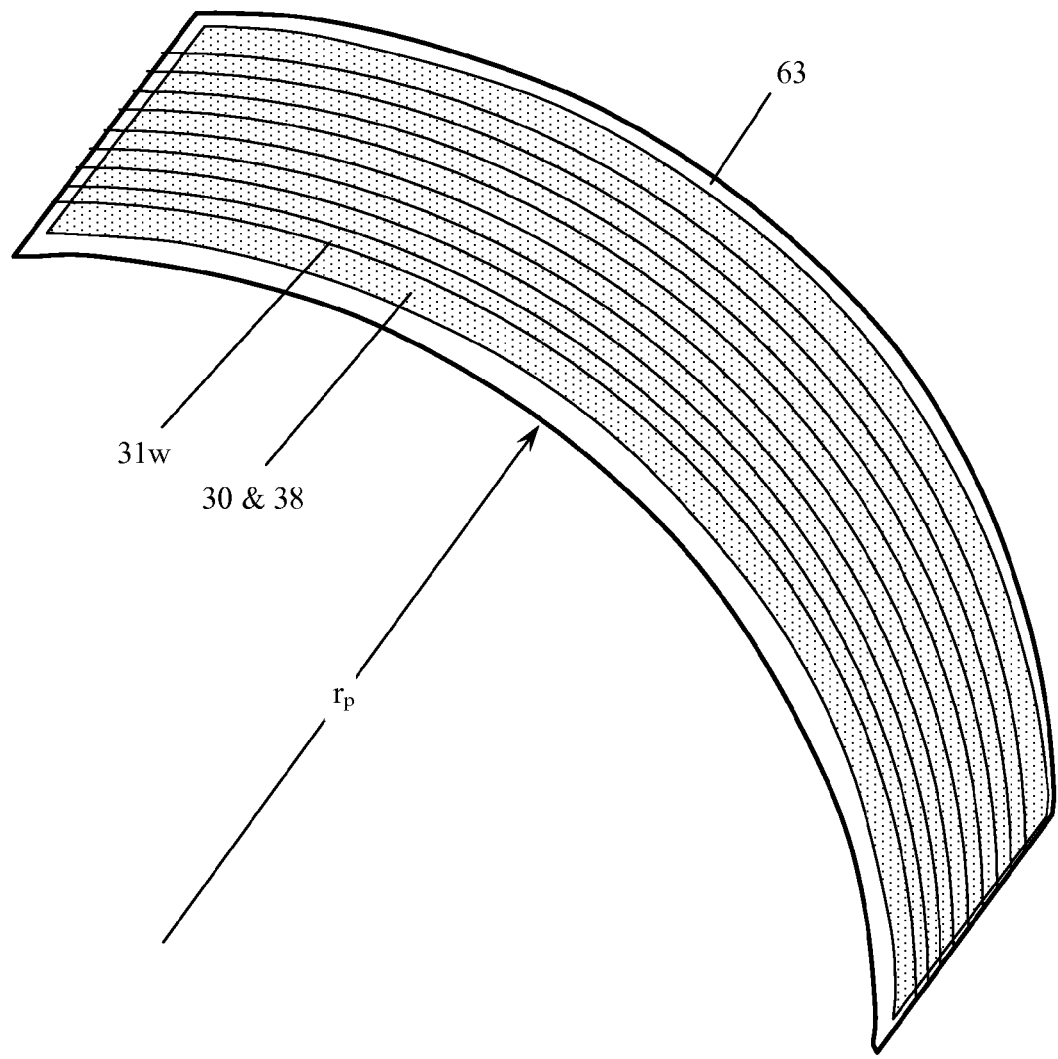
FIG. 10 schematically illustrates the process of bending a sheet to force wires to flow into a polymer coated substrate.

FIG. 10 shows a method of using a bent plate 63 to force a polymer 38 coated substrate 30 out into wrapped wires 31w. This method uses a process similar to the drum process explained above in FIG. 9. A polymer 38 coated PET substrate 30 is placed on a plate 63 and wrapped with the wire electrode 31w on a set pitch. Note that printed circuit boards with an edge connector may be attached to the ends of the plate 63 to set the pitch of the wire 31w and allow for direct connection to the drive electronics. After the wire 31w is wrapped around the plate 63, the plate 63 may be bent away from the wires 31w, which allows the wires 31w to be strung extremely straight. The plate 63 may then be bent toward the wires 31w to a given radius of curvature, $r_p$. Bending the plate places tension on the wire electrodes. The amount of tension or stress on the wires 31w is given by $$\text{Stress}_{bend} = YM_w\{[(r_p+t_s+r_w)/(r_p-r_w)]-1\} \quad \text{Equation 4}$$

where $r_p$ is the radius of curvature of the plate. The plate 63 may be bent in many different ways. It may be bent over a mandrel or drum, the center may be pushed out, the plate may be squeezed from the top and bottom, the plate may be sagged, etc. After the plate 63 is bent, the plate 63 is placed in an oven and the increased temperature used to soften the polymer 38 places an additional stress on the wire due to the difference in thermal expansions between the plate 63 and wire 31w materials. This stress is identical to that explained above in Equations 1-3 except the diameter of the drum, $d_D$, is replaced by twice the radius of curvature of the plate, $2r_p$. Therefore, the total stress on the wire 31w is the combination of the two stresses. Note that the total stress placed on the wire 31w has to stay well below the yield stress of the wire 31w material to guarantee that the wire 31w does not break. Two or more plates 63 may alternatively be used in this process. The plates 63 have their perspective polymer 38 coated PET substrates 30 and are placed back-to-back (or in a polygon). Therefore, when the wire 31w is wrapped on the plates 63, two or more separate electroded polymer sheets are produced during the process.

After the wire electrodes 31w are imbedded into the polymer 38 coated PET substrates 30, the TCE 31f may be patterned onto the wire electrodes 31w. A similar process to that just explained to imbed the wire 31w into the polymer 38 could be used. The plate(s) 63 may be flattened and a wire or thread mask 69 may be wrapped around the plate(s) 63 between the wire electrodes 31w. The plate(s) 63 may be bent to spring the wire or thread mask 69 straight and then the plate(s) 63 may be bent to tension the wire or thread mask 69. After the surface of the wire 31w electroded substrate 30 is sprayed with a TCE 31f, the wire or thread mask 69 may be unwound to create a patterned TCE 31f. The printed circuit boards may be soldered onto the wire electrodes 31w to create an electroded sheet with attached electronics for an information display.

Figure 11A:
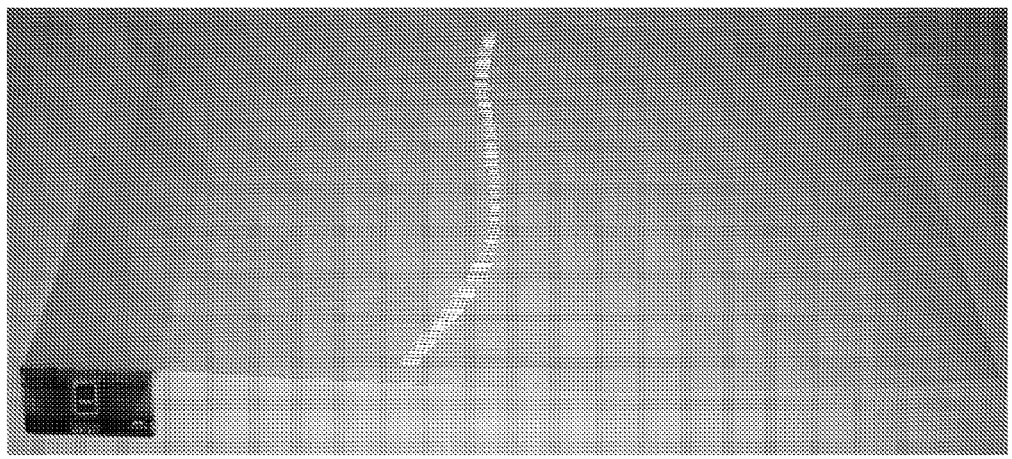
FIG 11a is a photograph of an electroded sheet with the wire electrodes coming out orthogonal to the imbedded wires in the main body of the panel.
Figure 11B:
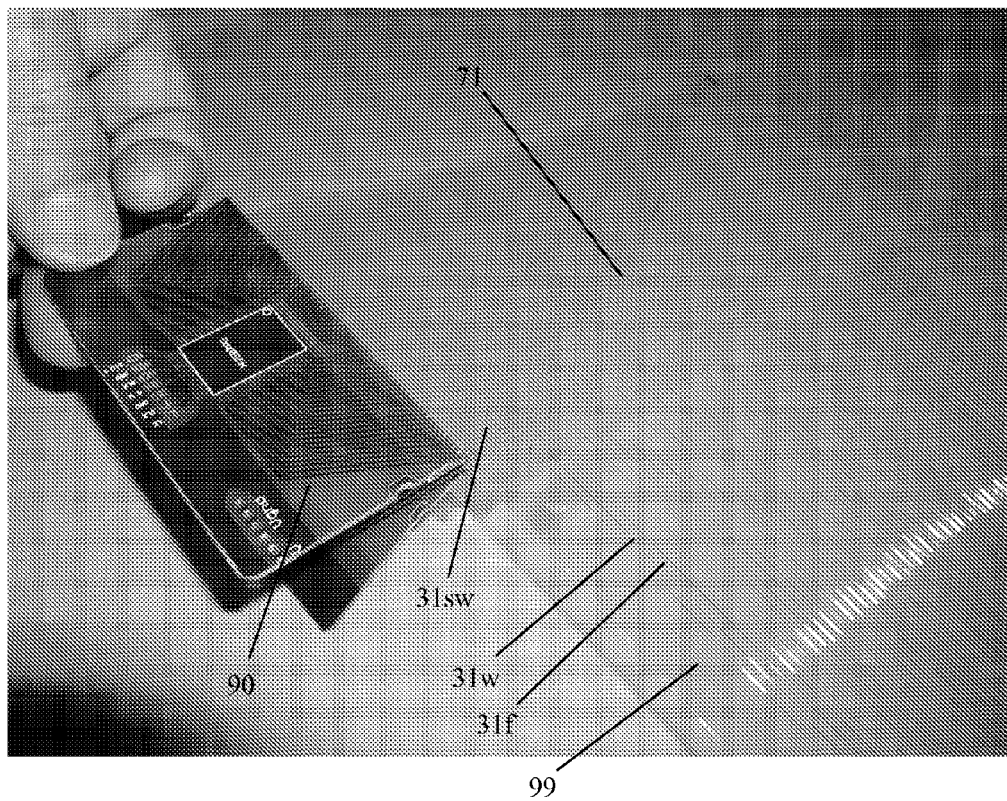

FIG. 11 shows a method of bringing the wire electrodes 31w out of the electroded sheet 99 orthogonal to the direction of the imbedded of wires 31w in the main body of the panel. A locking film 71 is sealed across the imbedded wire electrodes 31w at an angle on the edge of the electroded sheet 99. Note that the TCE coating 31f, patterned onto the imbedded wire electrodes 31w, should be masked during deposition such that the end of the electroded sheet 99 is not coated where the locking film 71 is sealed. The imbedded wire electrodes 31w are then stripped out of the surface of the polymer film 38 back to the locking film 71 and bent 90 degrees and soldered into a printed circuit board 90 on the edge of the electroded sheet 99. Assuming that the driver chip on the printed circuit board 90 has 64 outputs (like most standard chips), once 64 wire electrodes 31sw are stripped, bent and soldered a second locking film 71 is placed over the stripped wires 31sw to electrically isolate them from the surface. A third locking film 71 is placed at an angle across the $2^{nd}$ bank of 64 wire electrodes 31w and they are stripped back to the locking film 71, bent 90 degrees and soldered into a $2^{nd}$ circuit board 90 stacked on top of the first circuit board 90. The wires 31w in the electroded sheet 99 may be stripped, bent and connected to the circuit board 90 in banks of 64 until all the wires 31w are brought out of the electroded sheet and connected to circuit boards. Note that the first bank of 64 wire electrodes 31sw are covered with n-1 layers of stripped wires 31sw, where n is the number of banks of wires 31w. To minimize the stiffness of the edge connector very thin polymer coated 38 PET 30 may be used as the locking layers 71. Also alternating banks of 64 wires 31w out both sides of the electroded sheet minimizes the bending force when the display is rolled. The wire electrodes 31 sw may alternatively be brought out all four corners of the electroded sheet 99, which allows for a solid edge connector on both orthogonal sides to the imbedded wire electrodes 31w. Using two electroded sheets 99 with standard edge connected circuit boards 90 sandwiched around the orthogonal wire 31sw electroded sheet creates a double sided panel.

Figure 12A:
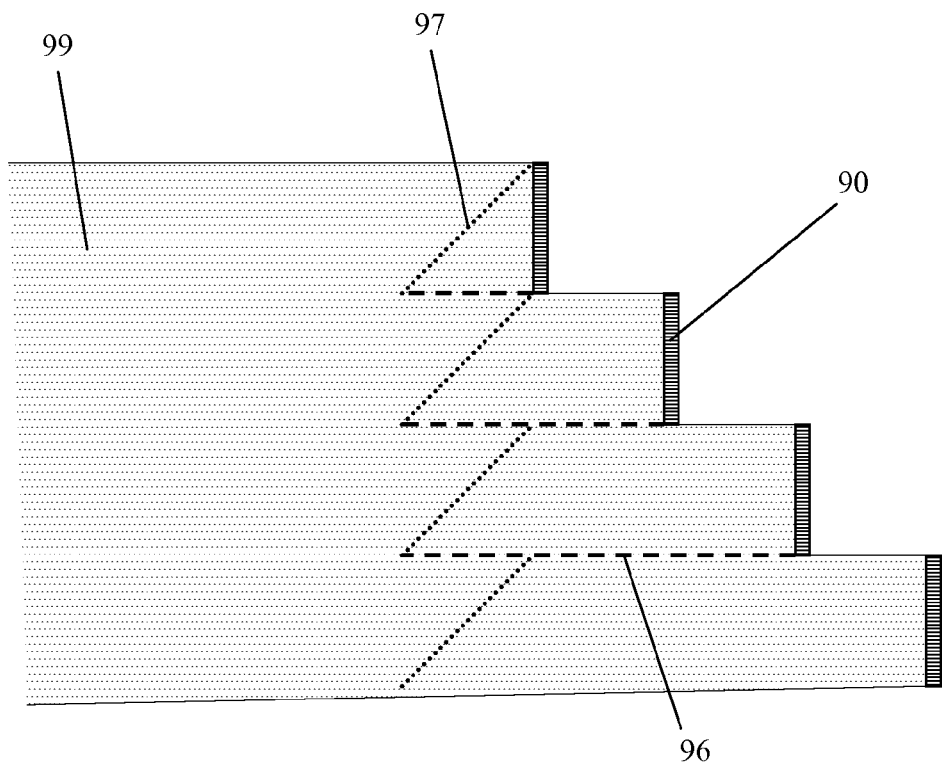
FIG. 12a schematically shows an end of an electroded panel with slices and fold lines.
Figure 12B:
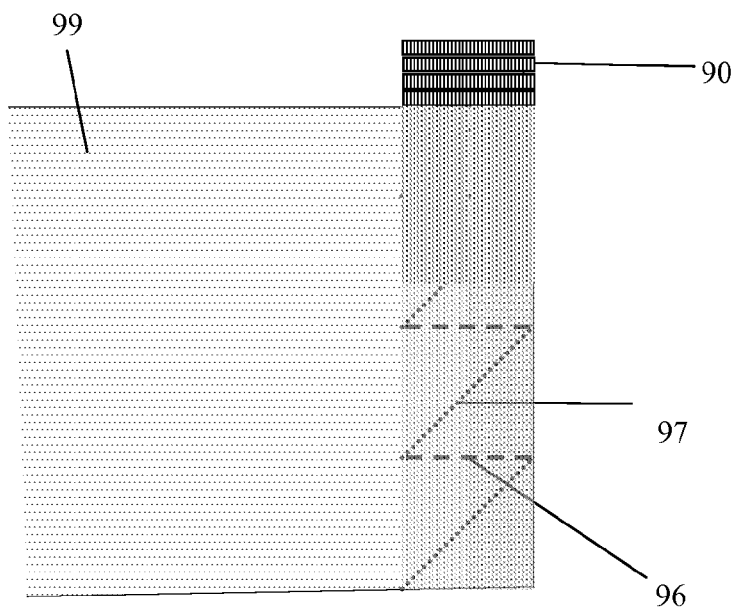
FIG. 12b schematically shows the electroded panel in FIG. 12a with the end folded such that the wire electrodes are coming out orthogonal to the wires in the main body of the panel.

FIGS. 12a and 12b show another method of bringing the wire electrodes 31w out of the electroded sheet 99 orthogonal to the direction of the imbedded wires 31w in the main body of the panel. FIG. 12a shows the edge of the electroded sheet 99 with a staggered end in banks with the wire electrodes 31w connected to circuit boards 90. The staggered end is coated with a locking film 71 to electrically isolate the wires from the surface and sliced 96 back between the banks to the edge of the locking film 71. Folding each bank at their fold line 97 routes that bank 90 degrees such that the circuit boards 90 are all stacked on one corner of the electroded sheet 99 as shown in FIG. 12b.

Maskless Process

Figure 13:
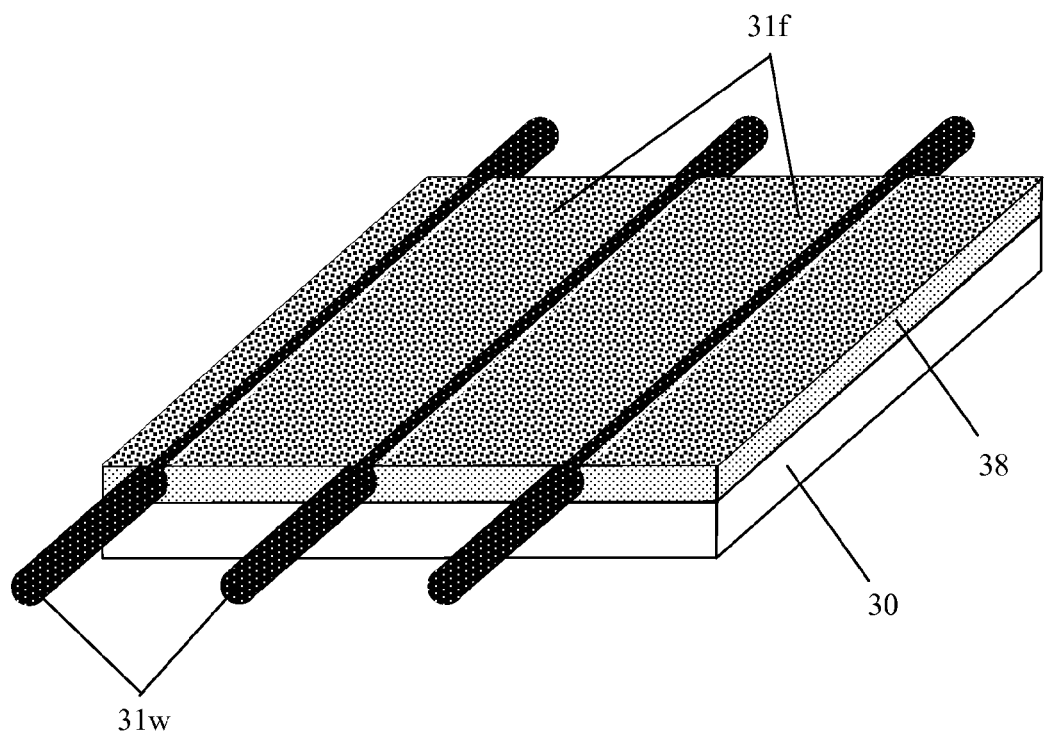
FIG. 13 schematically represents an electroded sheet formed using a maskless process.

FIG. 13 shows a schematic of a section of the electroded sheet. The electroded sheet includes a base material 30 such as PET, coated with a polymer 38, into which the wire electrodes 31w are embedded. A transparent conductive electrode (TCE) coating 31f is applied to the surface of the polymer 38 and wires 31w. The TCE coating 31f is patterned such that each strip only contacts one wire 31w, with a small area of no coating next to the adjacent wire 31w. This will allow for current to pass through an individual wire 31w, spread the charge to the side through the TCE 31f, stopping just before it reaches the adjacent wire 31w. In this manner, individual lines may be addressed by attaching the individual wires 31w to a circuit board and separately addressing them as required for the specific images.

FIG. 14 shows the method of making an electroded sheet using a "maskless" process. FIG. 14a shows wire electrodes 31w arrayed on the surface of a polymer substrate 38/30. The structure in FIG. 14a is preferably obtained by wrapping a PET 30/Polymer 38 sheet (preferably preshrunk) on a drum (of higher thermal expansion than the wire) of sufficient diameter to give the length and width of electroded sheet desired. The sheet is wrapped such that the PET 30 is against the drum. The wire 31w is wrapped around the covered drum, controlling the tension on the wire 31w, and traversing either the wire 31w or the drum to give the desired spacing between the wires 31w. The beginning and the end of the wire 31w is secured to the polymer or drum for subsequent processing. The wire 31w may be wrapped using guides or any other means desired to control the spacing and uniformity.

Figure 14A:
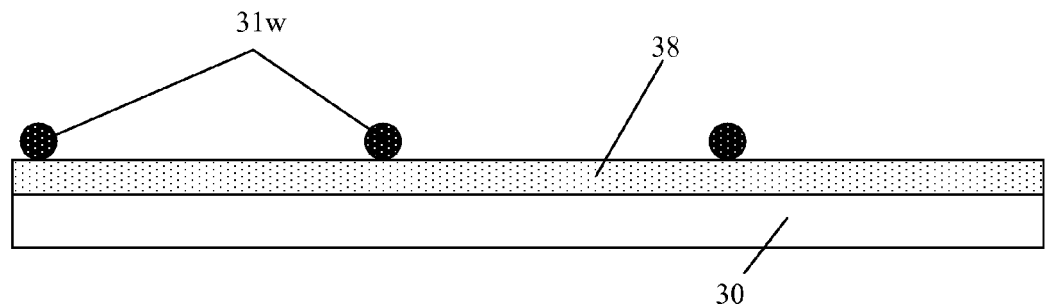
FIG. 14a is a schematic of a PET/Polymer sheet with wires positioned on the polymer prior to embedding into the polymer.

An alternate method to form the structure in FIG. 14a is to place the PET 30/Polymer 38 sheet on a stiff plate, and wrap back and forth across the sheet with guides/pins at either end to hold the wire 31w and give the proper spacing. Tension in the wire 31w must be controlled. The beginning and the end of the wire 31w is attached to the polymer or plate by tape or any other means. The wrapped stiff plate is then placed in a fixture and bent to a radius to put the desired tension on the wires 31w and hold them 31w tight to the plate.

Figure 14B:
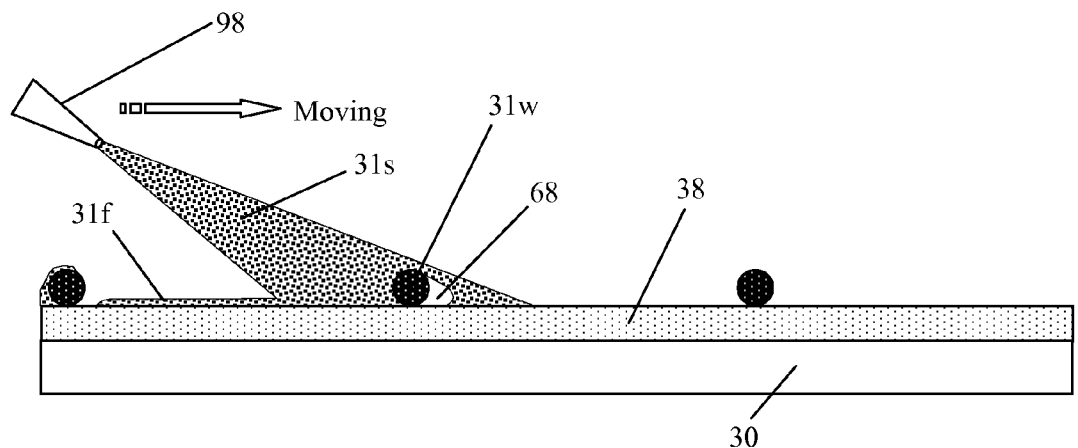
FIG. 14b is a schematic of the process used to coat the electroded sheet with a transparent conductive electrode.

FIG. 14b shows the sheet in FIG. 14a being coated with the transparent conductive material 31f. The wrapped drum or radiused plate is sprayed with a TCE coating 31s at an angle across the wire electrodes 31w. Any area not to be coated should be masked off before spraying. The substrate 38/30 containing wire electrodes 31w is positioned so the spray nozzle 98 is at one end of the sheet and positioned to spray at an angle (preferably 1° to 89°) relative to the substrate and normal to the wire electrodes 31w. The preferable spray angle is just shy of 45 degrees. The wires 31w act as a mask 68 preventing coating on one side of the wire 31w. The TCE spray nozzles 98 move across the polymer surface 38 and down the length of the substrate (or the substrate moves under a stationary nozzle) at the speed and spacing necessary to give the desired coating thickness. Multiple coats may be required to achieve the required conductivity and uniformity of the TCE 31f. The traverse speed of the nozzle 98, concentration of the TCE, spray pressure, distance between the nozzle 98 and the substrate, and air flow around the sprayed part, among other parameters, all affect the coating concentration and uniformity of the TCE coating 31f on the substrate 38/30 and wire electrodes 31w.

Figure 14C:
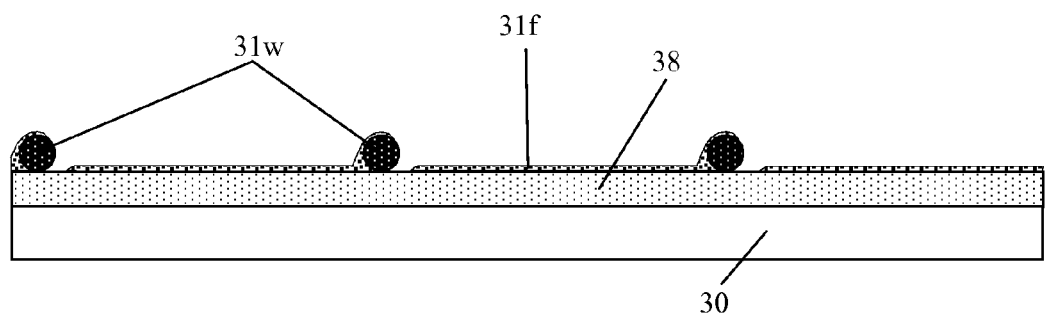
FIG. 14c represents the substrate containing wire electrodes coated with a TCE film using a maskless process.

FIG. 14c shows the substrate 38/30 containing the wire electrodes 31w from FIG. 14b after spray coating the TCE 31f at an angle. The transparent conductive electrode 31f is preferably uniformly coated on the polymer 38 and one side and top of the wire electrodes 31f. The wires 31w have served as a shadow mask to create patterned TCE strips 31f and now they 31w are ready to be embedded into the polymer surface 38.

Figure 14D:
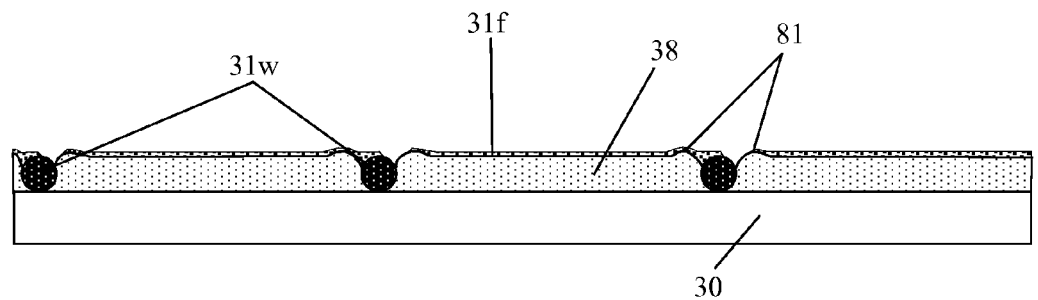
FIG. 14d shows a schematic of the wires embedded into the surface of the polymer substrate.

FIG. 14d shows the sheet from FIG. 14c after embedding the wires 31w into the polymer 38. The wires 31w are embedded into the polymer 38 by placing the drum (or bent plate) with the wire coated electroded sheet into an oven at a temperature above the softening point of the polymer 38. The temperature is chosen to maximize the conductivity of the transparent conductive polymer 31f and provide the proper tension on the wires 31w to allow them to embed into the polymer 38 down to the surface of the PET 30. Note the wires 31w are embedded into the surface using a contactless process so as not to disturb the electrical connection between the wire 31w and the TCE 31f. Once embedded, the drum or plate with the electroded sheet is cooled slowly to prevent stresses in the electroded sheet. The polymer layer 38 holds the wires 31w in place. After embedding, there may be some shorts across the uncoated area near the wires 31w. These shorts may be burnt open by applying a voltage across adjacent wires 31w.

The wire electrodes 31w have to be under tension, such that there is a normal force that presses them 31w against the polymer substrate 38/30 during the entire coating and embedding processes. The normal force, caused by the tension in the wires 31w, has to be large enough to hold the wires in place during the spraying process step and has to be large enough to completely embed the wires into the polymer surface 38. After the wires 31w are coated with the TCE 31f, they could be pressed into the surface using a roller or plate, however the roller or plate would disrupt the coating on top of the wires. If a plate is used, then either the drum containing the TCE coated wires would have to be rolled across it or the TCE coating would have to be strong enough to hold the wires onto the polymer surface when the electroded sheet is removed from the drum or arced plate.

Figure 14E:
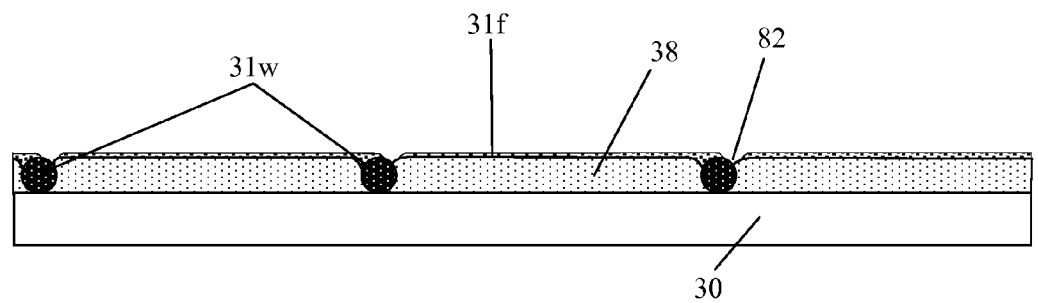
FIG. 14e shows a schematic of the electroded sheet after flattening the surface.
Figure 14F:
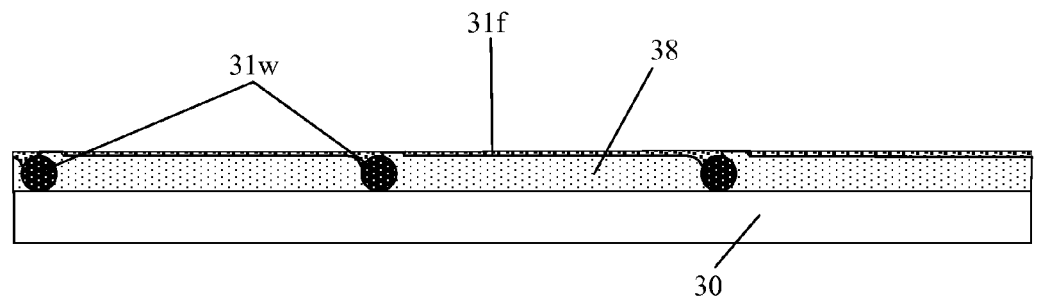
FIG. 14f shows a schematic of the electroded sheet after flattening the surface at a higher temperature.

In some display applications, especially those involving a liquid crystal material, it is imperative to flatten the surface of the electroded sheet. When the wire electrodes 31w are embedded into the polymer 38 surface, they 31w have to displace the same amount of polymer 38 as their 31w volume. This displaced polymer will form mounds 81 along side of the wire electrodes 31w. FIG. 14e shows an electroded sheet that has been run through a flattening process. The electroded surface is pressed against a flat non-stick surface (such as silicone coated glass) and upon heating the electroded sheet above the softening point of the polymer 38 causes the surface to flow. Pressure may be applied by placing the assembly in a vacuum bag or by using a pressure diaphragm against the PET surface 30. Flattening while under vacuum removes any air pockets that may cause defects or irregularities in the flattened surface. A soft flattening process, where the temperature is only raised slightly above the softening point for a short period of time flattens the mound 81 around the wires 31w, but the polymer does not flow enough to fill the voids 82 around the wires. In order to create a very flat surface, as shown in FIG. 14f, the viscosity of the polymer has to be low enough to fill the void or the pressure on the electroded sheet in the flattening machine has to be high enough to flow the polymer 38. Slow cooling of the electroded sheet after flattening minimizes the stresses in the sheet. After flattening, there may be some shorts along side the wires from where the wires shadowed the TCE 31f. These shorts may be burned out by applying a voltage across adjacent wires 31w.

Figure 14G:
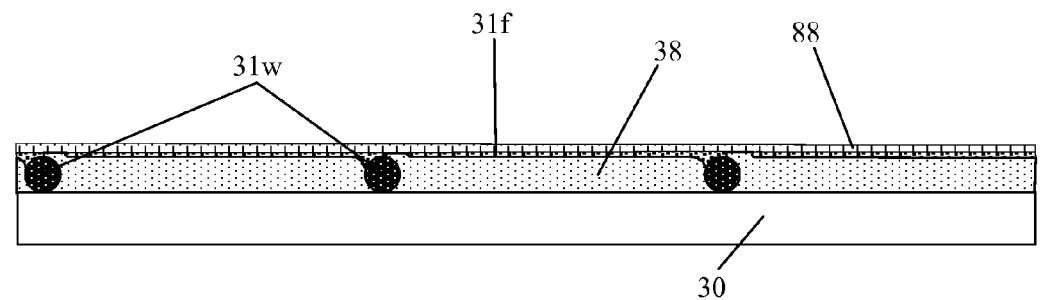
FIG. 14g shows the electroded sheet with a film applied to the surface.

FIG. 14g shows the electroded sheet with a film 88 applied to the surface. The film 88 may be applied before or after the flattening process step. The film 88 may be applied as a spray or sheet and may be a polymer or a silicone base material. The film 88 may also server as a chemical or physical blocking layer or barrier for a subsequent display manufacturing process. The barrier 88 may be designed to stop the penetration of water or ions from the outside environment into an electrooptic layer, such as a liquid crystal or an emissive electrooptic material, like an organic light emitting material (OLED). Note ions coming through the electroded sheet tend to mask charge or voltage applied to a capacitor (switch) that is used to modulate a LC. Also if the electroded sheet is used for an OLED device, then a barrier film 88 to water has to be applied to the surface because water or oxygen tends to destroy the OLED material. A barrier film 88 may alternatively be used to stop ion migration from a component inside the panel into the electroded sheet. If an ionic electrooptic material is used, then the ions can randomly migrate around in the display. If the ions migrate to the other side of the electrode, where they are no longer in the presence of an electrostatic field, then they can not be moved. Therefore, these electrostatically immobile ions contain charges which create an electric field of their own and may cause addressing issues. Ions or other chemical materials may migrate from inside the panel through the electroded sheet to the outside environment if the proper barrier layer 88 is not applied to the electroded sheet. One example where a barrier is needed is to contain a corrosive material like is traditionally in an electrochromic display.

The barrier may also be placed on the flattening plate and transferred to the electroded sheet. The flattening plate may have a release coating on it and the barrier may be deposited on the release film for easy transfer. In fact, the wire electrodes 31w or the transparent conductive coating 31f may also be strung/deposited on a plate and transferred into the surface of the polymer substrate.

The film 88 may also be an adhesive layer to help the electroded sheet surface bond to another display component. The film modified electroded sheet surface used in many different display applications, such as, a tubular plasma display, a plasma-addressed display, a liquid crystal display, an electrochromic display, an OLED, or any other electronic display.

Webbed Process

Figure 15:
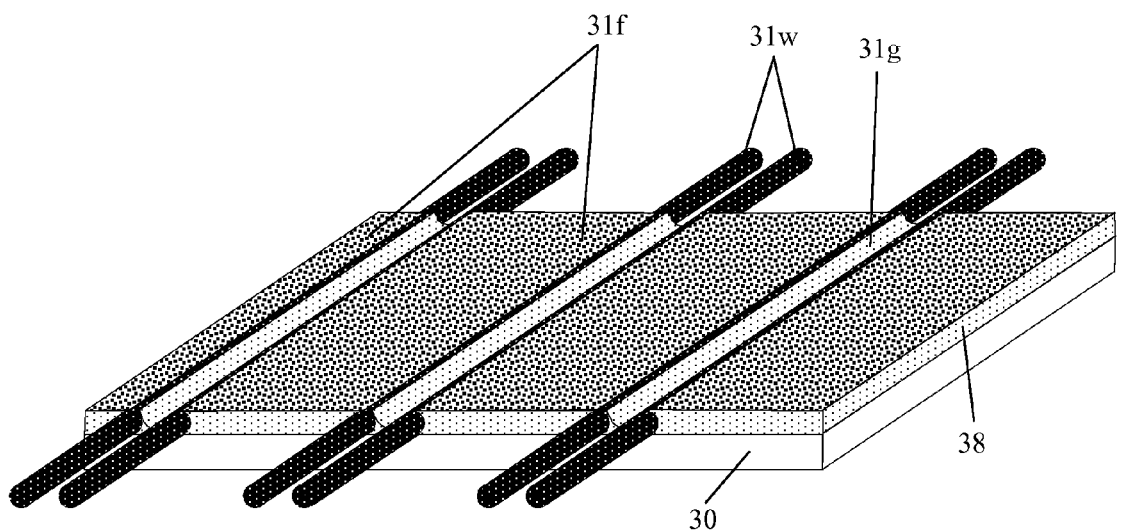
FIG. 15 schematically shows a section of the electroded sheet formed using a web process.

FIG. 15 shows a schematic of a section of the electroded sheet formed using a web process. The electrode sheet includes a polymer substrate with wire electrode pairs 31w and transparent electrode webs 31f coated between the wire electrode 31w pairs. The wire electrode 31w pairs are separated by small gaps 31g that are formed during the manufacturing process explained below. These small well defined gaps 31g are very advantageous when the electroded sheet is used as a sustainer plate in a tubular plasma display.

Figure 16A:
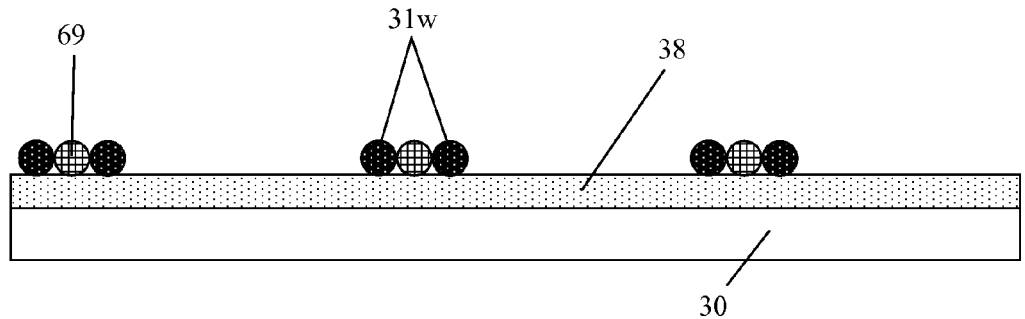
FIG. 16a schematically shows a polymer substrate with wires and masks positioned on the surface.

FIG. 16a shows the first step in forming a webbed electroded sheet by arraying wire electrode 31w pairs with masks 69 between the wire electrode 31w pairs on the surface of a polymer substrate 38/30. One method to form this webbed electroded sheet is to start by wrapping a polymer 38/PET 30 substrate (preferably preshrunk) on a drum, where the drum has a higher thermal expansion than the wire. The polymer substrate 38/30 is wrapped such that the PET 30 is against the drum. The wire 31w (copper, steel, tungsten, or any other conductive metal) and mask 69 (wire, nylon, thread, fiber, or any other material that may be removed before or after embedding) are then wrapped around the substrate covered drum. The tension in the wire 31w and mask 69 are controlled and the wire 31w pitch is controlled by traversing either the drum or the wire/mask guiding tool. The wire 31w and mask 69 may be wrapped individually or together using guides or any other means desired to control the spacing and uniformity. The mask 69 does not have to be the same material as the wire, nor the same diameter. It must be able to be easily removed from the polymer 38, and its diameter controls the spacing or gap 31g between the wire electrode 31w pairs.

Alternatively the webbed electroded sheet is formed by placing the substrate 38/30 on a stiff plate and wrapping the wire 31w and mask 69 back and forth across the substrate between guides/pins at both ends of the plate. Tension in the wire 31w and mask 69 must be controlled. The beginning and the end of the wire 31w and mask 69 are attached to the polymer or plate by tape or any other means. The wrapped stiff plate is then placed in a fixture and bent to a radius to put the desired tension on the wires 31w. Note that the tension in the wires may be controlled by the radius of curvature of the plate; therefore the thermal expansion of the plate does not have to be higher than that of the wire electrodes.

Figure 16B:
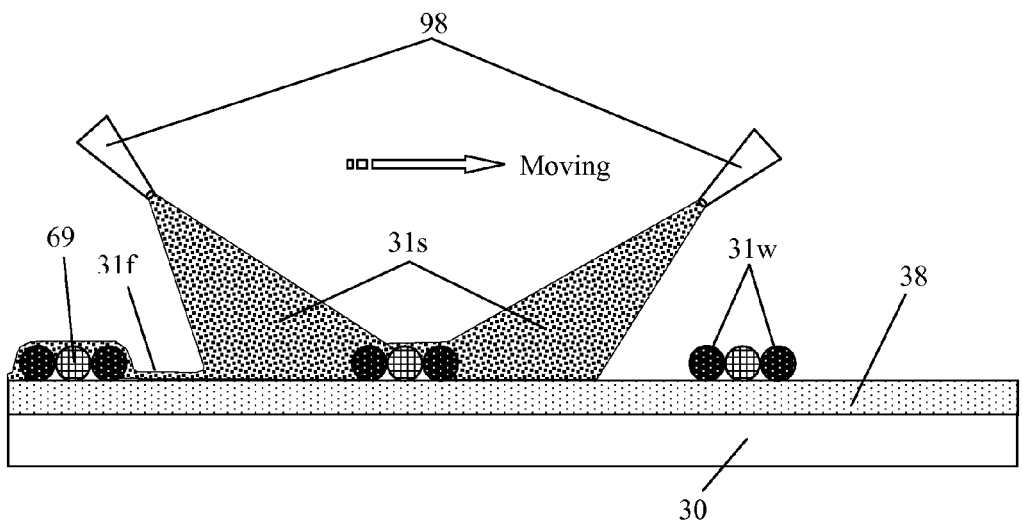
FIG. 16b schematically shows the spray process used to coat the transparent conductive electrode material on the wire masked polymer substrate.

FIG. 16b shows the sheet obtained in FIG. 16a being coated with the transparent conductive material 31f. A spray system 98 is used to coat the surface of the polymer substrate 38/30 and the wire electrodes 31w. The transparent conductive material must be sprayed 31s at a low angle and in both directions normal to the wire electrodes to assure that the TCE coating 31f covers the entire polymer surface 38, including under the edges of the wire 31w. The speed, step distance, angle and number of passes of the spray nozzles 98 must be controlled to achieve the electrical connection, conductivity and uniformity of the final TCE coating 31f. The concentration of the TCE, spray pressure, distance between the nozzle 98 and the substrate, and air flow in the spray system also affect the concentration and uniformity of the TCE coating 31f.

Figure 16C:
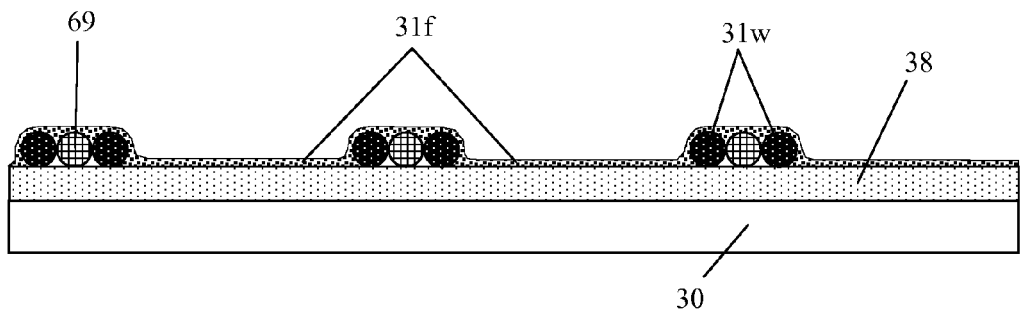
FIG. 16c schematically shows the electroded sheet after the coating process step.

FIG. 16c shows the substrate 38/30 containing the wire electrodes 31w from FIG. 16b after spray coating the TCE 31f. The transparent conductive polymer 31f is preferably uniformly coated on the polymer 38 and around the wire electrodes 31f. The coated electroded sheet is now ready to have the wires embedded.

Figure 16D:
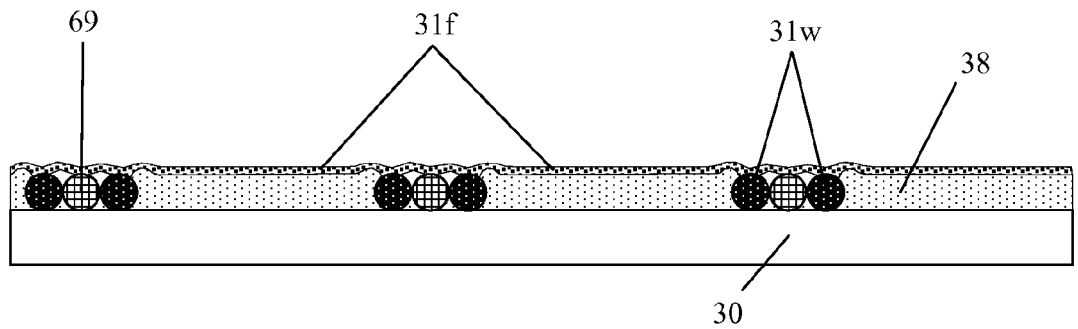
FIG. 16d shows a schematic of the wires and mask embedded into the polymer.

FIG. 16d shows the sheet from FIG. 16c after embedding the wires 31w and mask 69 into the polymer 38. The wires 31w and mask 69 are preferably embedded into the polymer 38 by placing the drum (or bent plate) with the coated TCE 31f into an oven at a temperature above the softening point of the polymer 38. The temperature is chosen to maximizes the conductivity of the TCE 31f and provide the proper tension on the wires 31w to allow them to embed into the polymer 38 down to the surface of the PET 30. The thermal expansion of the mask 69 may be larger than the drum or plate and the mask 69 does not have to get embedded in to the surface of the polymer film 38. Once the wires are embedded, the drum or plate with electroded sheet is cooled slowly to prevent stresses in the electroded sheet. The polymer layer 38 holds the wires 31f in place. Note that the wire electrodes 31w and mask 69 may be embedded into the polymer 38 surface before the sheet is coated with the TCE 31f.

Figure 16E:
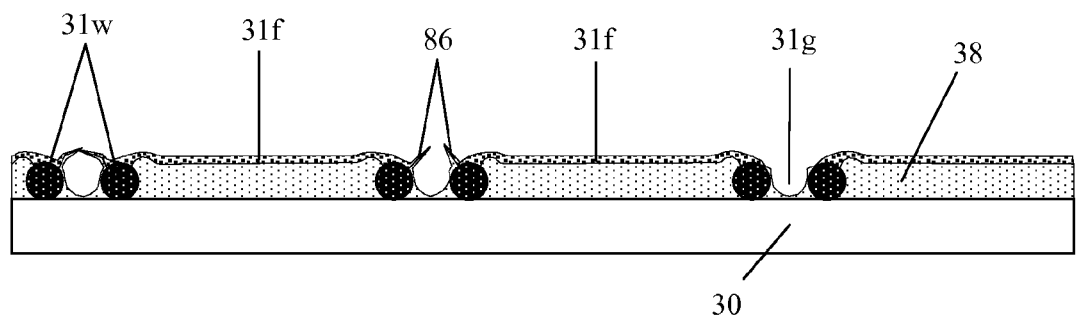
FIG. 16e shows a schematic of the wires embedded in the electroded sheet with the mask removed.

FIG. 16e shows the electroded sheet from FIG. 16d after the mask 69 is removed. After embedding, the mask 69 must be removed or stripped out of the polymer 38 surface. This must be done carefully such that the wires 31w are not pulled from the electroded sheet by the mask 69, and also such that any TCE 31f or polymer 38 stripped with the mask 69 does not fall onto the electroded sheet. Stripping the mask 69 from the electroded sheet leaves some shorts 86 between the wires because of the polymer 38 and TCE 31f over the mask 69. These shorts 86 may be burned open by applying a voltage across adjacent wire electrode 31w pairs. Because the TCE 31f forms a web between wire electrode 31w, no potential is applied across the TCE 31f coating, therefore causing no harm to the TCE 31f during the electrical short removal process. If a flat electroded sheet is desired then it is advantageous to burn these shorts 86 open after the flattening process step.

Figure 16F:
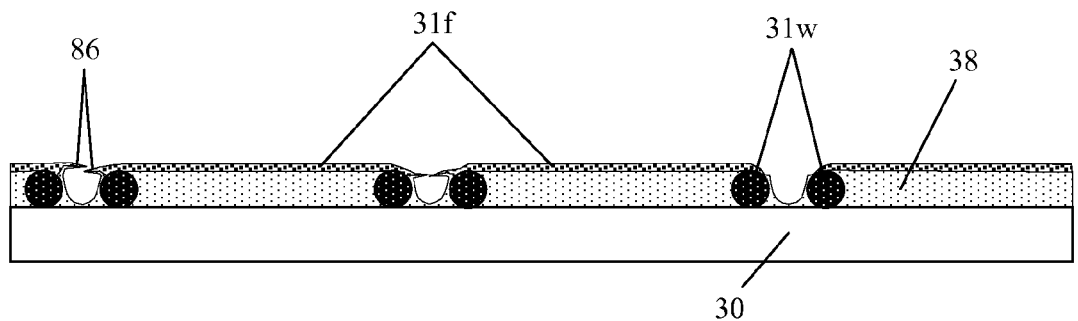
FIG. 16f shows a schematic of the electroded sheet after flattening the electroded surface.
Figure 16G:
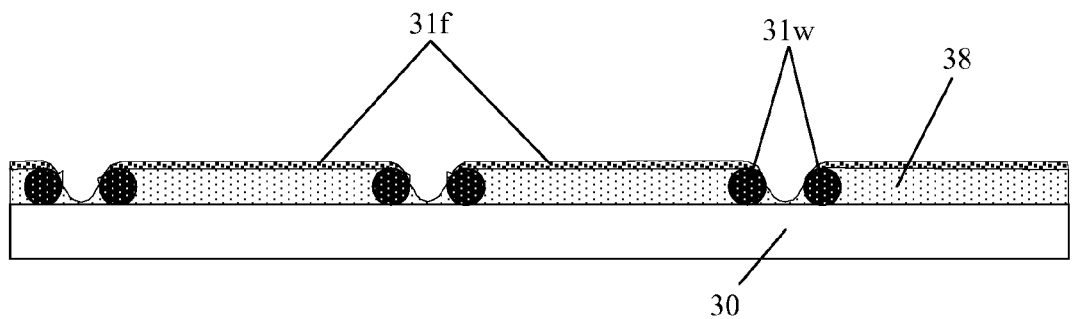
FIG. 16g shows the flattened electroded sheet with a planarizing layer applied to the surface.

FIG. 16f shows the electroded sheet from FIG. 16e after the electroded surface is flattened. The electroded surface may be flattened by pressing it against a flat non-stick surface (such as silicone coated glass or a silicone coated high temperature plastic) while heating the electroded sheet slightly above the softening point of the polymer 38. Pressure is preferably applied by placing the assembly in a vacuum bag, or by using a pressure diaphragm (vacuum press) against the PET surface 30. Flattening under vacuum removes any air pockets that may cause defects or irregularities in the flattened surface. The time, temperature and pressure of the flattening process has to be controlled so the wire electrodes 31*w* do not move into the void 31*g* and come into contract. If the diameter of the wire electrodes 31*w* is the same as the thickness of the polymer 38 then the wires 31*w* are pinched between the flattening plate and the rigid lower PET 30 substrate and keeps them from moving together. Slow cooling of the electroded sheet after flattening minimizes the stresses in the electroded sheet. After flattening, there may be some shorts 86 across the area between the wires from where the mask 69 was removed. These shorts 86 may be burned open, as shown in FIG. 16*g*, by applying a voltage across adjacent wires 31*w*.

Figure 16H:
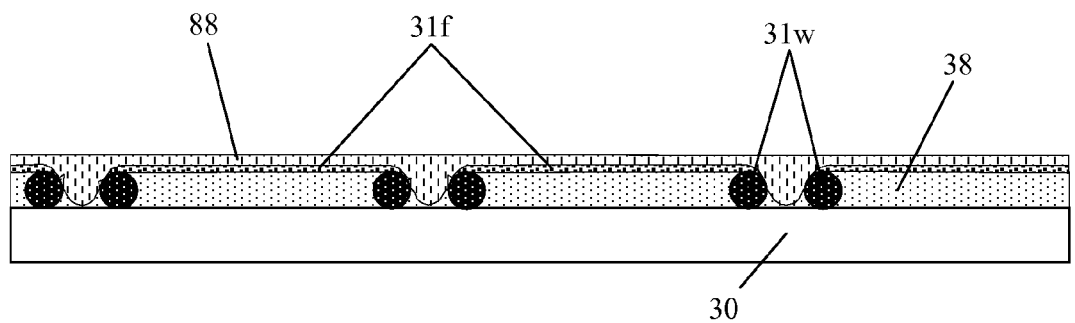
FIG. 16h shows a planarization layer applied to the surface of the electroded sheet to remove the voids formed between the pairs of wire electrodes.

A planarization layer 88 may be applied to the surface of the electroded sheet to remove the voids 31*g* formed between the pairs of wire electrodes 31*w*, as shown in FIG. 16*h*. This planarization layer 88 may be added before or after the flattening process step. If the planarization layer 88 is applied before the flattening process step and its 88 softening point is lower than that of the polymer 38 substrate then the planarization layer 88 will flow into the void 31*g* before the polymer 38 substrate softens. The planarization layer 88 may also serve as an adhesive film to attach another display component to the electroded sheet. If the web-based electroded sheet is used as a sustainer plate in a tubular plasma display then leaving the void 31*g* between the pair of wire sustain electrodes 31*w* creates a region with a lower dielectric constant. Therefore, a smaller amount of the voltage drops directly between the wires, thus extending the electric field farther into the plasma tubes.

Heating the Wires

Some applications of the present invention require a chemically durable or higher temperature polymer substrate. In these types of applications the polyolefin 38 part of the substrate is not chemically durable enough or it softens at too low of a temperature. Therefore, it is desirable to have the wire electrodes embedded directly into the PET 30 substrate. However, some of the processes explained above, such as tensioning the wires into the surface, can not be used. Pushing the wires into the surface using a flat plate is difficult because PET does not start to soften until about 200° C. and the viscosity curve is not very steep making it almost impossible for the PET to flow up around the wires before it melts at about 250° C. The PET could be melted and allowed to flow around the wires, but the wires would have to be held to the plate surface and not allowed to penetrate into the surface. This entire process would have to be preformed in a vacuum at high temperatures, which makes the equipment very complicated and expensive.

One method of placing the wires into the surface at a low system temperature is to directly heat the wires. The wires may be directly heated using inductive, irradiative or resistive heating. Since the wires are made of metal they will suscept or absorb microwaves and may be inductively heated. If a high enough current flows through the wires, their temperature increases as a result of the resistive heating in the wire. The wires can also be irradiated with light (UV, visible or IR) to increase their temperature. In order for the wires to get imbedded in the surface of the PET, the wires have to be heated enough to melt the PET. The base temperature of the PET may be elevated to reduce the amount of power applied directly to the wires in order to embed them into the surface of the PET. The most simple and efficient process of embedding the wires into PET is to use a vacuum bag or a vacuum press with a microwave heating chamber that may be tuned for the load. Wire electrodes may be wrapped around a very flat plate, such as glass, and PET substrates may be placed over the wire electrodes on both sides of the glass plate. The entire substrate with wires and PET sheets may be placed in a vacuum bag and a vacuum, preferably below 100 mTorr, may be pulled inside the bag around the wire electrodes. The vacuum bag may then be placed in an oven that has both a thermal heater and a microwave heater. The temperature of the vacuum bag with enclosed parts may be increased to about 150° C. and then the microwave may be applied to increase the temperature of the wires high enough (>260° C.) to melt the PET and sink into the surface. The elevated temperature of the base PET allows the melted PET material from under the wire electrodes to flow around the wires and out across the surface.

Figure 17:
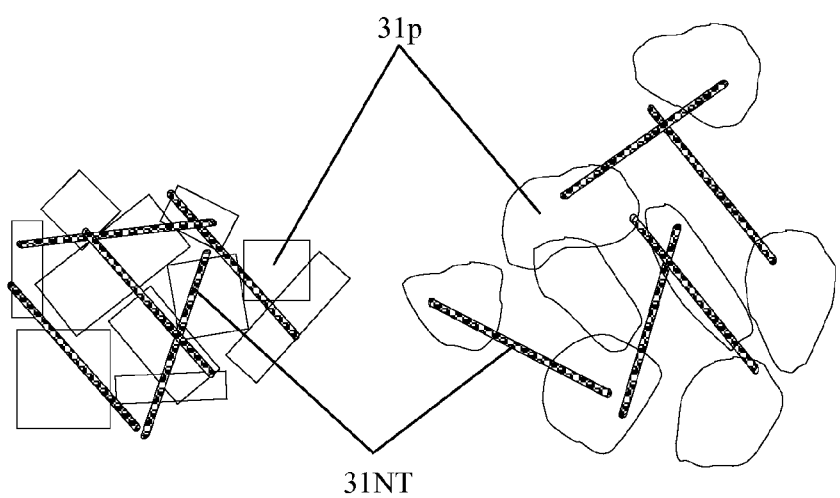
FIG. 17 shows islands of transparent conductive polymer interconnected with carbon nanotubes.

FIG. 17 shows an example of a transparent conductive coating deposited on a surface containing a mixture of transparent conductive polymer 31*p* and carbon nanotubes 31NT. If the concentration of conductive polymer 31*p* is low or it has a high surface tension then it forms islands. If these conductive polymer islands 31*p* are electrically disconnected, then they will not spread the voltage across the surface. Adding carbon nanotubes 31NT into the transparent conductive polymer while spraying or depositing the coating allows the nanotubes 31NT to bridge these polymer islands 31*p* and electrically connect them. The carbon nanotubes 31NT may also be coated over the island polymer 31*p* coating after the polymer coating 31*p* has been deposited. A very thin transparent electrically connected coating is capable of using this dual component 31*p* & 31NT coating.

One issue for some of the electroded sheets discussed above is the flatness of the final surface. In some display applications, like a tubular plasma display, the requirements on the final surface flatness is not very stringent (less than about 25 μm) and most of the surface roughness may be compensated for in an adhesive layer used to attach the electroded sheet to the plasma tube array. However, other electronics displays, especially those including liquid crystals, require that the surface roughness is below 1 μm to achieve proper addressing and uniformity across the panel. Therefore, a post surface flattening process has to be performed for most if not all of the electroded sheets manufactured. The final flattening step needs to be performed under a vacuum in order to remove any air in the electroded sheet/flattening plate interface. The pressure should preferably stay below about 200 mTorr to keep any bubbles from forming in the interface. The grooves along side the wire electrodes provide vacuum ports to remove any trapped air in the center of the electroded sheet. These vacuum ports may raise the required minimum vacuum to a couple of Torr.

One potential issue with creating any patterned electrode structure is shorts between the TCE lines. These shorts are easily found by applying an interlaced voltage to the wire electrodes, that is applying a voltage to all the even electrodes while keeping the odd electrodes at ground potential. If there is a short, current flows between the interlaced connected electrodes. If the voltage and current is high enough and the short is small enough then it may be "burned" open. If the current is regulated, the short area will sink all the current and heat-up. A thermal camera may then be used to spot the location of the short (the area of short will get hot from the current flow) and the short could be repaired or scraped/scratched open.

In cases where the electroded sheet has a very thin substrate 30, the electroded layer may serve as a double-sided addressing layer. However, in this case, the electro-optic material on the substrate 30 side would have a voltage drop through the substrate whereas an electro-optic material on the electrode side would be in direct contact with the electrodes. A true double-sided electroded sheet may be produced by adding an additional polymer layer 38 with imbedded wire electrodes 31w connected to TCEs 31f on the non-electroded side of the substrate 30. The second electroded layer may be parallel to the first or orthogonal to the electrodes on the other side of the substrate 30. These thin double-sided electroded sheets allow for the fabrication of very large color displays.

Zigzag Electrodes

Figure 18:
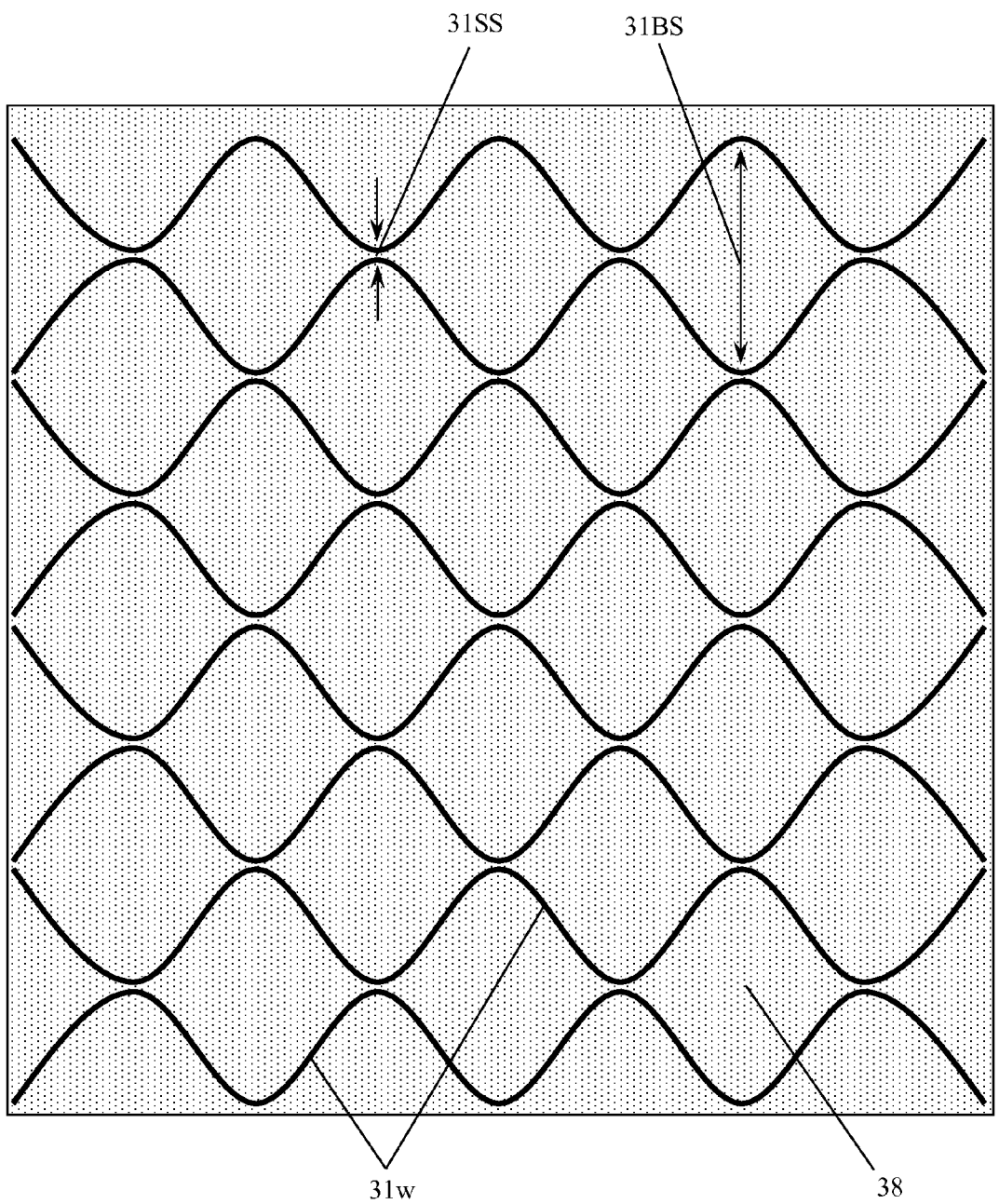
FIG. 18 schematically shows a planar view of an electroded sheet with the wires in a zigzag pattern.

Most of the above discussion was on adding a transparent electrode coating to a wire electrode to spread the voltage across the row of pixels. There are some displays, such as a plasma display, that do not require the transparent coating and the spreading of the voltage, if required, can be achieved using more than one wire per electrode line. In plasma displays that use a surface discharge top electrode structure (presently all color PDPs use this structure) firing of the plasma is sustained using two closely spaced sustain electrodes. These closely spaced sustain electrodes create a high panel capacitance in large displays. To lower the panel capacitance it is advantageous to only have the sustain electrodes closely spaced where the plasma is to be fired. Creating this closely spaced wire sustain electrode area 31SS followed by the sustain electrodes moving away from each other 31BS will form a zigzag pattern in the wire sustain electrodes 31w embedded in the surface 38 of the electroded sheet, as shown in FIG. 18.

One issue with the zigzagged electroded sheet is that in order to achieve proper firing of the plasma in a tubular plasma display the electroded sheet will have to be aligned to the plasma tube array. Each plasma tube will have to be aligned such that the centerline of the plasma tube is attached to the electroded sheet along the line of the close spacing 31SS of the wire electrodes 31w. It will be possible to fire the plasma in the plasma tubes and align each tube to the electroded sheet by maximizing the luminous of the plasma generated light. Note that no alignment is required in electroded sheets with straight wires.

Figure 19:
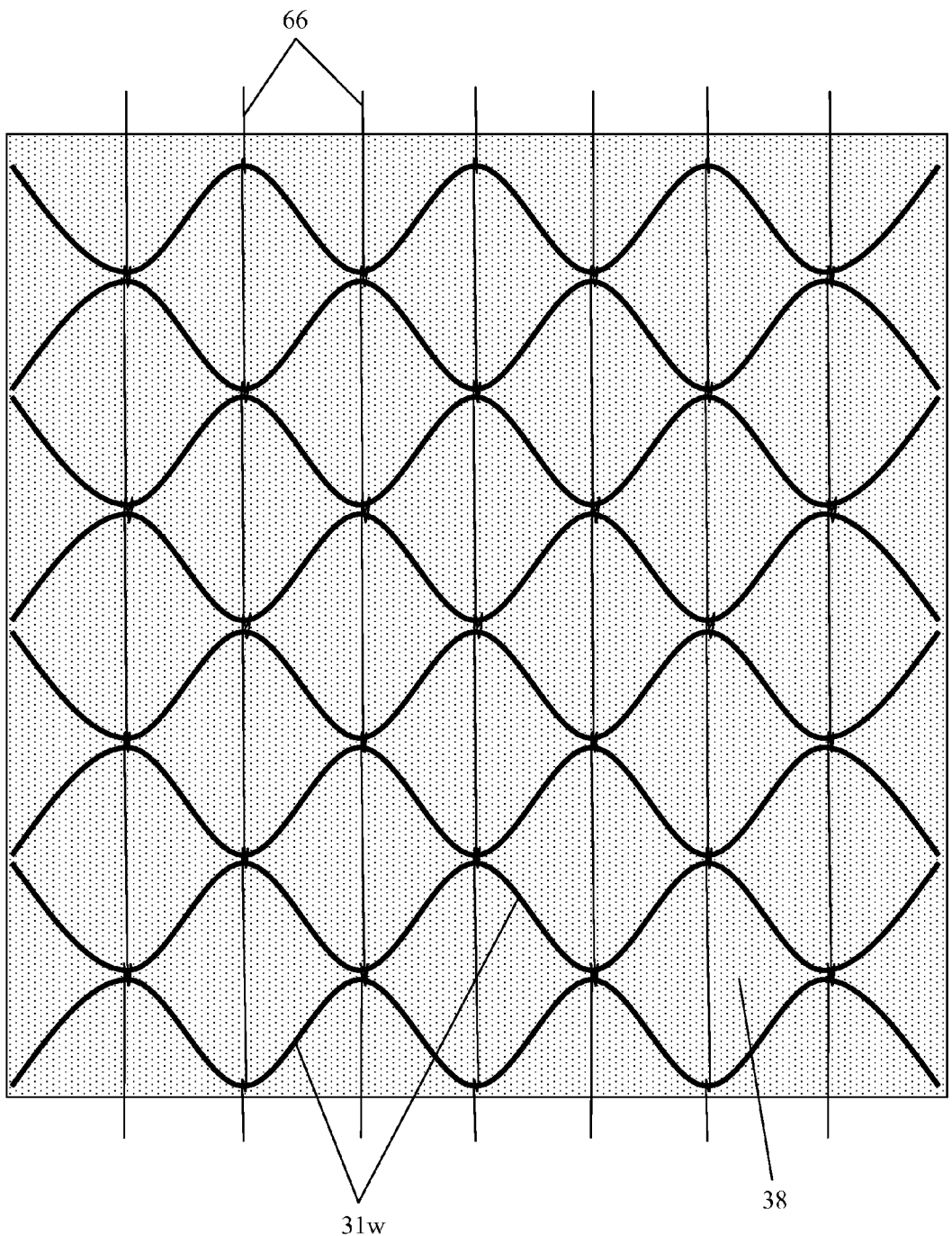
FIG. 19 schematically shows a planar view of an electroded sheet with the wires in a zigzag pattern formed by tying the wires into a mesh.

The zigzagged electroded sheet may be fabricated using several different techniques. FIG. 19 shows a method of forming the zigzag structure where the wire electrodes 31w are tied together using small thread-like material 66 to form a wire electrode mesh. The wire mesh can be stretched across the surface of the polymer substrate and embedded in the polymer surface 38. The thread-like material 66 can be removed, via heat or chemicals (liquid or gas), once the wires are held against the polymer surface 38 during the embedding process, so they do not move. If the thread-like material 66 is made out of a low melting point polymer than it 66 may be melted into the surface 38 of the electroded sheet. Melting the thread-like material 66 into the electroded sheet surface will eliminate the requirement of removing the material 66 from the electroded sheet.

Figure 20:
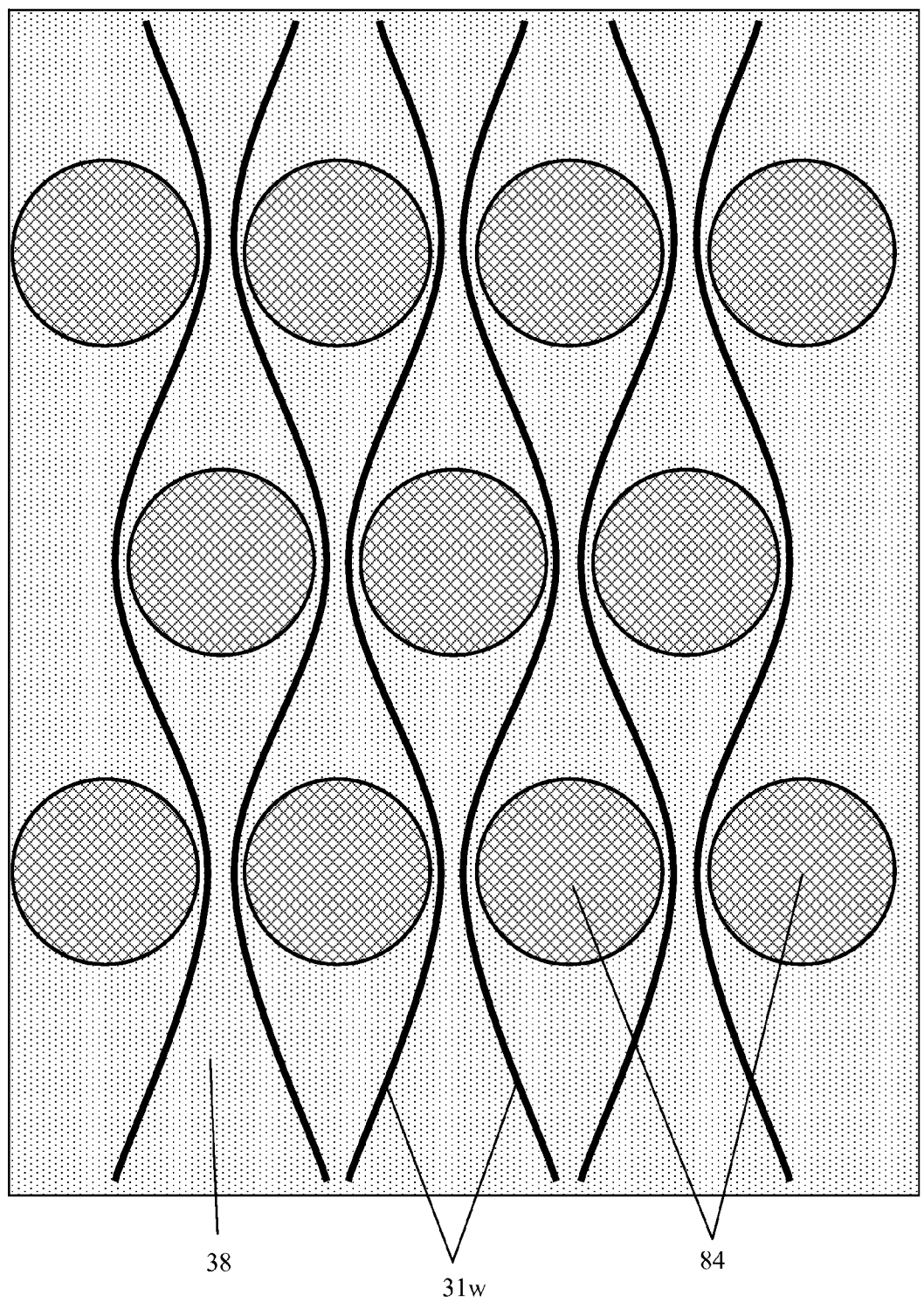
FIG. 20 schematically shows a planar view of an electroded sheet with the wires in a zigzag pattern formed using pins.

FIG. 20 schematically represents a method of using pins 84 to make the wire 31w zigzag structure. The wire electrodes 31w can be interleaved between rows of pins 84 and when the pins 84 are forced together the wires 31w will form around the pins 84 to form the zigzag patter. The pins 84 on a carrier with the zigzag wires 31w can then be placed down onto a polymer substrate and the wires can be pushed out of the pin array 84 and into the polymer surface 38 to form an electroded sheet. A soft metal material, like copper, may be required in some of the zigzag forming processes, so it can be easily stretched and formed into the zigzag pattern. The surface of the wire electrodes can also be coated with a film, which may include carbon nanotubes, to spread the effective voltage away from the wire electrode or to remove a reflection from the wire.

One family of color displays are reflective and bistable or multistable. Bistability means that when an electro-optic material is modulated to a different state it holds that state until it is forced back to its original state, where multistable means the electro-optic material has many stable states. These reflective color displays may replace standard color prints. There are two methods of creating a reflective color display or electronic sign. One method places the red, green and blue (RGB) pixels side-by-side like is presently done in all color video displays. A second method stacks the red, green and blue pixels on top of each other. This stacking method requires that the electro-optic material may be modulated from a transparent state to a reflective red, green or blue state. This stacking method also allows for the usage of the entire pixel to reflect the entire visible spectrum. In contrast, when the RGB colors are placed side-by-side, ⅔ of the light is wasted because the red pixel does not reflect green or blue, and a similar phenomenon occurs for the green and blue pixels. Therefore, a RGB stack three layer panel is required to create a high quality reflective color display. There are two known materials that may be modulated from a transparent to a reflective R/G/B state, a cholesteric liquid crystal (developed by Kent Displays) and a smectic-A liquid crystal (developed by PolyDisplay/TechnoDisplay). Both of these liquid crystals have thresholds and may be passively addressed. Therefore, reflective color electronic signs may be fabricated by using three separate panels consisting of two orthogonal electroded sheets sandwiched between each of the three color liquid crystal materials. A reflective color electronic sign may also be formed using two single-sided electroded sheets sandwiching two double-sided electroded sheets with the three primary color liquid crystals layers between each electroded sheet. Note that if the display is reflective then it would be advantageous to use cyan, magenta and yellow instead of red, green and blue for the colored liquid crystal materials.

Some layers in flat panel displays require RGB color filters. In these cases, the color filter may be added to the electrode sheet. The RGB colors may be added to the TCE coating such that when they are deposited in a pattern, the color filter is deposited at the same time. In this case the RGB color filter is inherently aligned with the electrodes. The color filter may also be applied on top of the electroded sheets.

An electroded sheet may be used in many different types of displays. It may be used as the two electroded substrates sandwiched around a passively addressable electro-optic material like a liquid crystal (LC). It may alternatively be used in a three-layer stacked RGB liquid crystal display like discussed above. An electroded sheet may alternatively be used as the column addressing plane in a plasma-addressed electro-optic display (PA-EO). In this case, the electroded sheet serves to set the charge in the plasma channels and act as a ground plane for modulation of the electro-optic material. The plated out charge in the plasma channels creates an electric field, which may be used to address several different electro-optic materials: liquid crystals, twisting balls or twisting cylinders (like those being developed by Xerox "Gyricon"), electrophoretic materials (like those being developed by E-Ink or SiPix), or suspended particle devices (such as those being developed by Research Frontiers Incorporated).

If an electroded sheet is designed such that the electrodes are exposed to the surface, then they may be used to address electro-optic materials that require current such as, electrochromic displays and passive addressed organic light emitting diode (OLED) displays. The electroded sheet may also be used to address other electroluminescent materials, such as quantum dots (as being developed by QD Vision, MIT's QD-OLED, Evident Technologies). An electroded sheet may alternatively be used as a sustainer plane in plasma tube display or column address electrode plane in a plasma tube display (like the one invented by Owens-Illinois and Control Data and now being developed by Fujitsu), as detailed in Provisional Application Ser. No. 60/827,146, entitled "Tubular Plasma Display", filed Sep. 27, 2006 on the same day as the present application, which is included herein by reference. An electroded sheet could also be used for many other types of displays like microelectromechanical (MEMS) displays and 3-D and multi-view displays. The 3-D and multi-view displays may require that a lenticular or other lens shape be embossed into the electroded sheet while it is being formed.

Figure 21:
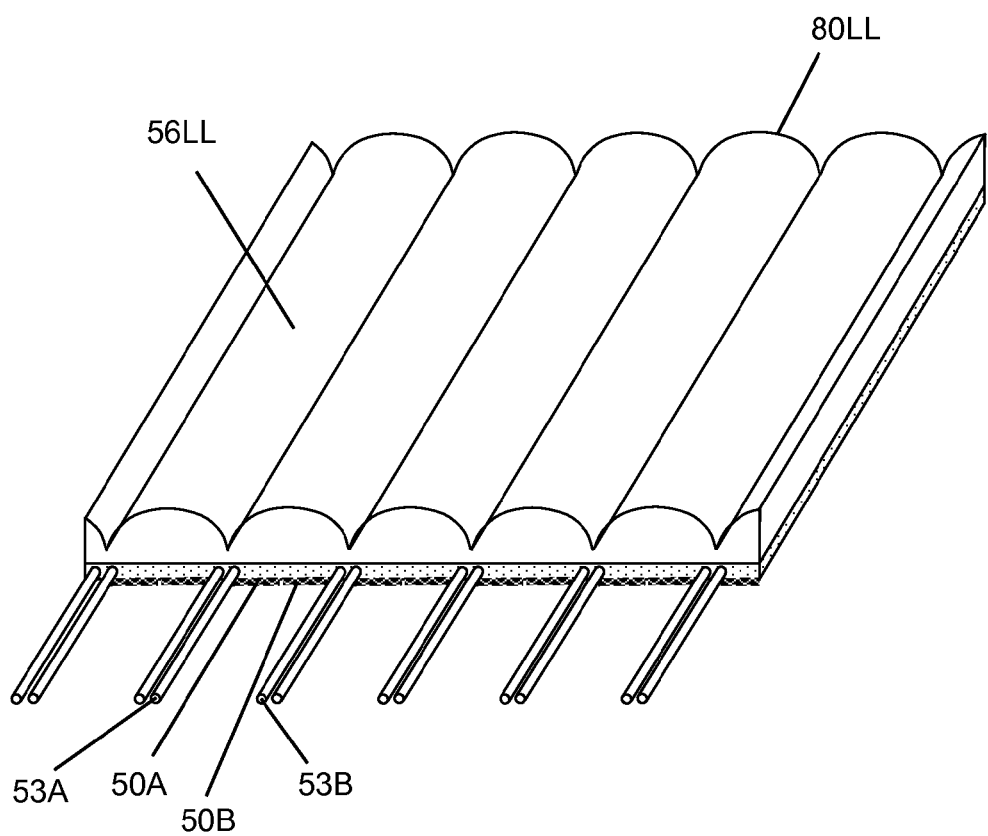
FIG. 21 schematically shows an electroded sheet with a lenticular lens embossed in the surface.
Figure 22:
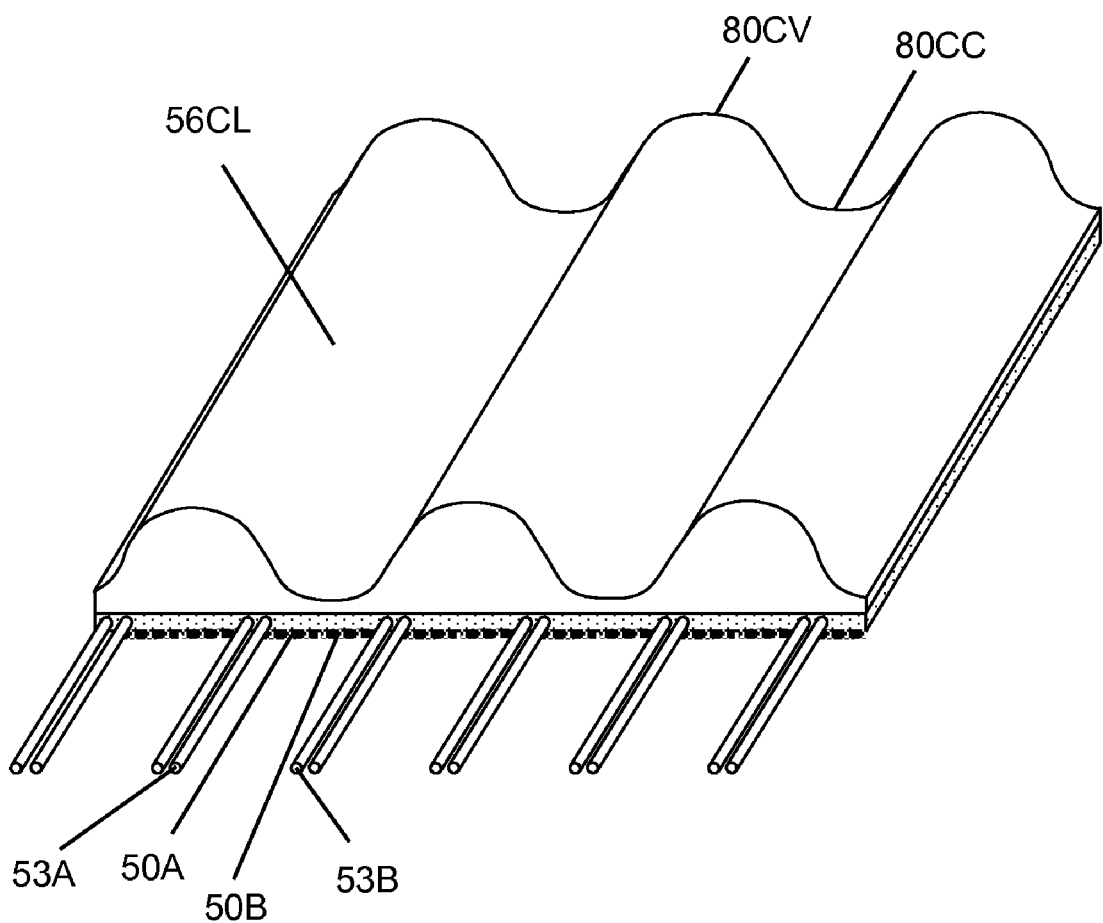
FIG. 22 schematically shows an electroded sheet with alternating convex and concave lenses embossed into the surface.

FIG. 21 shows the lens function to create multiple images or a 3-D image included in the electroded sheet. In this example, a lenticular lens 80LL is embossed into the electroded sheet 56LL. The lenses 80LL are aligned to the electrodes 53/50 in the electroded sheet 56LL. Note that there are two wire electrodes 53A and 53B attached to transparent conductive coatings 50A and 50B for each lens 80LL. These wire electrodes 53 and transparent conductive coatings 50 are preferably the same as the wire electrodes 31w and transparent conductive electrodes 31f discussed above. The lenses 80LL may be embossed into the surface of the electroded sheet 56LL or the lenses 80LL may be formed in a separate polymer sheet and bonded to an electroded sheet. Several different lens functions including concave 80CC and convex 80CV may be formed in the surface of an electroded sheet 56CL, as shown in FIG. 22. Fresnel-based lenses both in lenticular and circular form may be formed in the electroded sheets, however if a circular or rectangular Fresnel-based lens is used it also has to be aligned to the electrodes in the opposite direction, such as a plasma tube array.

The electroded sheets could also be used to form a display, like a reflective color electronic sign, as discussed above, and the electronic sign may be used in combination with another display, like a color video display. Combining more than one display will serve multiple purposes, such as, a reflective electronic sign, color video, three-dimensional display, multiple view display and a double-sided display. Combining a reflective bistable color liquid crystal electronic sign with a color video display creates a display that will optimally display static images using the liquid crystal sign section without phosphor burn-in and large energy consumption and will also be capable of creating full motion video. If a three layer color stacked liquid crystal display is formed using electroded sheets and it is attached to a tubular plasma display formed using plasma tubes attached to an electroded sheet, then the combined display perfectly serves both static and video images and is rollable.

EXAMPLE

This example uses an aluminum drum, 9"OD×6.5"L×¼" walls (28.3" circumference). A piece of polymer coated PET (MacTac TL5100 10 Mil Matte Polyester —7 mil thick Mylar® film with 3 mil thick polymeric adhesive) is cut 6" wide by 25" long. Double stick tape is used to attach both ends of the TL5100 film to the drum, polymer film facing outward. Once the TL5100 film is in place, 0.003"D Kovar wire is wrapped around the drum over the TL5100 film on a 0.100" pitch. Next the drum is placed in an oven at 130° C. for ½ hour. Calculations show that the 9"D aluminum drum expands 0.0228" in diameter going from 20° C. to 130° C., and the Kovar wire wrap diameter expands 0.0059". This difference of 0.0169" easily pushes the wires into the 0.003" polymer coating. Once the drum is at 130° C. and the wire is sunk into the polymer film the Kovar wire is stretched 0.0343" for each turn on the drum resulting in a total stress on the wire electrode of 24,200 psi. Since the yield stress of Kovar is 50,000 psi, the wire does not break.

The drum with wire electroded TL5100 sheet is removed from the oven and allowed to cool. A 0.002" Tungsten wire is wrapped tight around the drum between the 3 mil Kovar wire electrode to serve as a shadow mask. Masking tape is placed over the array covering about ½" of both ends and the sides (to prevent coating this area). The drum assembly is then placed on rollers and turned at about 1.5 in/sec. A transparent conductive polymer, TCP, coating is then sprayed on the drum. The TCP is a 1:1 mixture by weight of Baytron CPP 105D and isopropanol. The solution is sprayed using an airbrush at about 1 ml every 15-20 sec. After coating the array, the drum is then placed in a 40° C. oven for 15 min to cure the TCP coating. The 2 mil Tungsten mask is then unwrapped from the drum and the TCP coating is further cured with a hot air gun (~70° C. for 5 minutes). The Kovar wire electrodes are then taped across the drum to hold them on pitch and the electroded sheet is removed from the drum. A narrow piece of TL5100 film is then sealed at both ends to better secure the wires and the wire electrodes in the sheet are soldered into a circuit board. The resistance was measured between adjacent wire electrodes and when no shadow mask was used the resistance was about 3 kΩ. Across adjacent wires which were shadow masked the resistance was around 1 MΩ, however, after applying about 50 volts the resistance would increase to over 30 MΩ. Therefore, any small shorts may easily be "burned" open.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electroded sheet for an electronic display comprising:
   a) a polymer substrate wherein a width and a length of the substrate covers substantially a width and a length of the electronic display; and
   b) an array of wire electrodes embedded in a surface of the polymer substrate;
   wherein each wire electrode is a highly conductive thread-like or fiber-like material; and
   wherein the wire electrodes are formed using a standard wire forming process as free standing entities, are not evaporated or deposited on the substrate and are capable of being extended away from the substrate and connected directly to a printed circuit board.

2. The electroded sheet of claim 1, further comprising an array of transparent conductive electrode strips electrically connected to the wire electrodes.

3. The electroded sheet of claim 2, wherein the transparent conductive electrode is comprised of a material selected from the group consisting of:

a) a transparent conductive polymer;
b) a plurality of nanotubes;
c) a plurality of nanorods;
d) a physical vapor deposited coating; and
e) any combination of a) through d).

4. The electroded sheet of claim 2, wherein the transparent electrode strips are formed using a maskless process.

5. The electroded sheet of claim 2, wherein the transparent electrode strips are electrically connected to wire electrodes on both sides of the strip.

6. The electroded sheet of claim 1, wherein the wire electrodes are coated with a film that serves a purpose selected from the group consisting of:
a) removing a reflection from the wire electrodes;
b) assisting in connecting the wire electrode to a surface or interface;
c) assisting in making electrical connection to a transparent conductive electrode connected to the wires; and
d) any combination of a) through c).

7. The electroded sheet of claim 1, wherein the wires protrude less than 25 µm from the surface of the substrate.

8. The electroded sheet of claim 1, further comprising a polymer coating added to the substrate.

9. The electroded sheet of claim 8, wherein the wire electrodes are embedded in the polymer coating.

10. The electroded sheet of claim 1, wherein the sheet is used in creating a plane selected from the group consisting of:
a) at least one plane in a passive addressed electro-optic display;
b) at least one plane in a cholesteric liquid crystal display;
c) at least one plane in a smectic liquid crystal display;
d) a column electrode plane in a plasma-addressed display;
e) at least one addressing plane in a plasma tube display;
f) at least one electrode plane in an electrochromic display;
g) at least one electrode plane in an electroluminescent display;
h) at least one electrode plane in a quantum dot display;
i) at least one electrode plane in an OLED display;
j) at least one electrode plane in a passive addressed LC display;
k) at least one electrode plane in a MEMS display;
l) at least one plane in a 3-D display;
m) at least one plane in a multiple view display;
n) at least one plane in a flexible display;
o) at least one plane in a rollable display;
p) at least one plane in a curved display, and
q) any combination of a) through p).

11. The electroded sheet of claim 1, further comprising a conductive coating added to the wire electrodes.

12. The electroded sheet of claim 1, further comprising a circuit board connected directly to the wire electrodes.

13. The electroded sheet of claim 12, wherein the wires are connected to the circuit board at a direction orthogonal to a direction of the wires in a main body of the electroded sheet.

14. The electroded sheet of claim 1, wherein the wire electrodes are brought out of the sheet orthogonal to a direction of the wires in a main body of the sheet.

15. The electroded sheet of claim 1, wherein the wire electrodes are embedded into the polymer surface using at least one of the following:
a) at least one rigid plate;
b) at least one roller; and
c) at least one die.

16. The electroded sheet of claim 1, wherein the electroded surface of the sheet is flat.

17. The electroded sheet of claim 1, further comprising a barrier film added to an electroded surface of the electroded sheet.

18. The electroded sheet of claim 1, wherein heat is applied directly to the wire electrodes to soften the polymer substrate when the wire electrodes are embedded in the surface of the polymer substrate.

19. The electroded sheet of claim 1, further comprising at least one lens added to the surface of the electroded sheet.

20. The electroded sheet of claim 19, wherein the lens is embossed in the electroded sheet.

21. The electroded sheet of claim 19, wherein the lens is formed in a separate lens sheet and attached to the electroded sheet.

22. The electroded sheet of claim 19, wherein the display shows multiple images at the same time.

23. The electroded sheet of claim 19, wherein the display shows a three-dimensional image.

24. The electroded sheet of claim 1, wherein the wires in the electroded sheet form a zigzag pattern.

* * * * *